United States Patent [19]
Sindelar

[11] 3,878,372
[45] Apr. 15, 1975

[54] IMPROVED FEED RATE GENERATOR FOR MACHINE TOOL CONTROL

[75] Inventor: Emmett F. Sindelar, Moreland Hills, Ohio

[73] Assignee: The Warner & Swasey Company, Cleveland, Ohio

[22] Filed: Aug. 29, 1973

[21] Appl. No.: 392,680

[52] U.S. Cl............................. 235/151.11; 318/571
[51] Int. Cl......................... G05b 19/18; G06f 15/46
[58] Field of Search ....... 235/151.11, 151; 318/571, 318/573, 603

[56] References Cited
UNITED STATES PATENTS

| | | | |
|---|---|---|---|
| 3,617,718 | 11/1971 | Dummermuth | 235/151.11 |
| 3,633,013 | 1/1972 | Dummermuth | 235/151.11 |
| 3,651,314 | 3/1972 | Kosen | 235/151.11 |
| 3,725,651 | 4/1973 | Cutler | 235/151.11 |
| 3,725,654 | 4/1973 | Tripp | 235/151.11 |

Primary Examiner—Joseph F. Ruggiero

[57] ABSTRACT

A control for controlling movement of a machine tool along a path in accordance with commanded departure distances along mutually perpendicular first and second axes and at a velocity in accordance with a commanded vectorial velocity. A calculating circuit receives signals having vlaues which are functions of the commanded departure distances and calculates therefrom the value of the square root of the sum of the squares of these signals. A ratio calculator operates to provide a signal having a value corresponding with the ratio of a function of the vectorial velocity to that of a function of the vectorial summation of the commanded departures. This signal is employed as a modifying factor in reducing the pulse rate of a pulse train to provide feed rate pulses for use in controlling movement of the machine tool.

22 Claims, 13 Drawing Figures

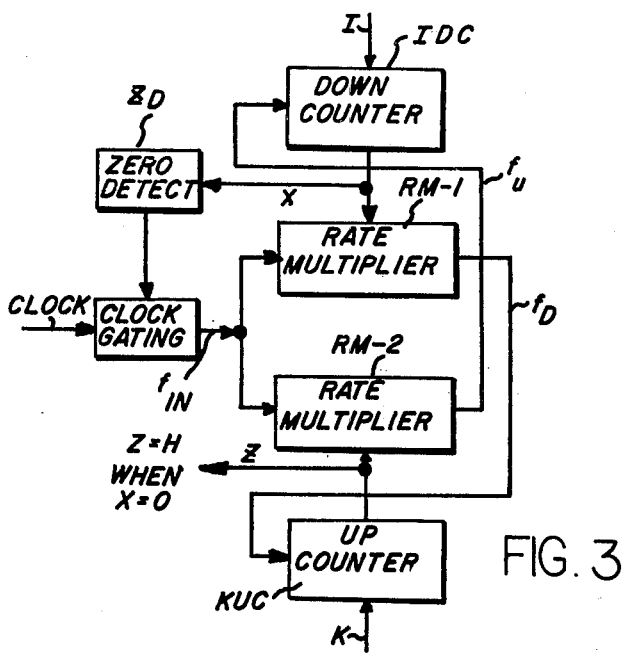
FIG. 3
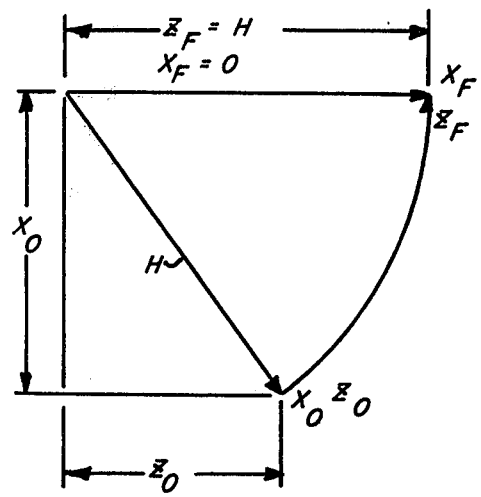
FIG. 4
FIG. 7
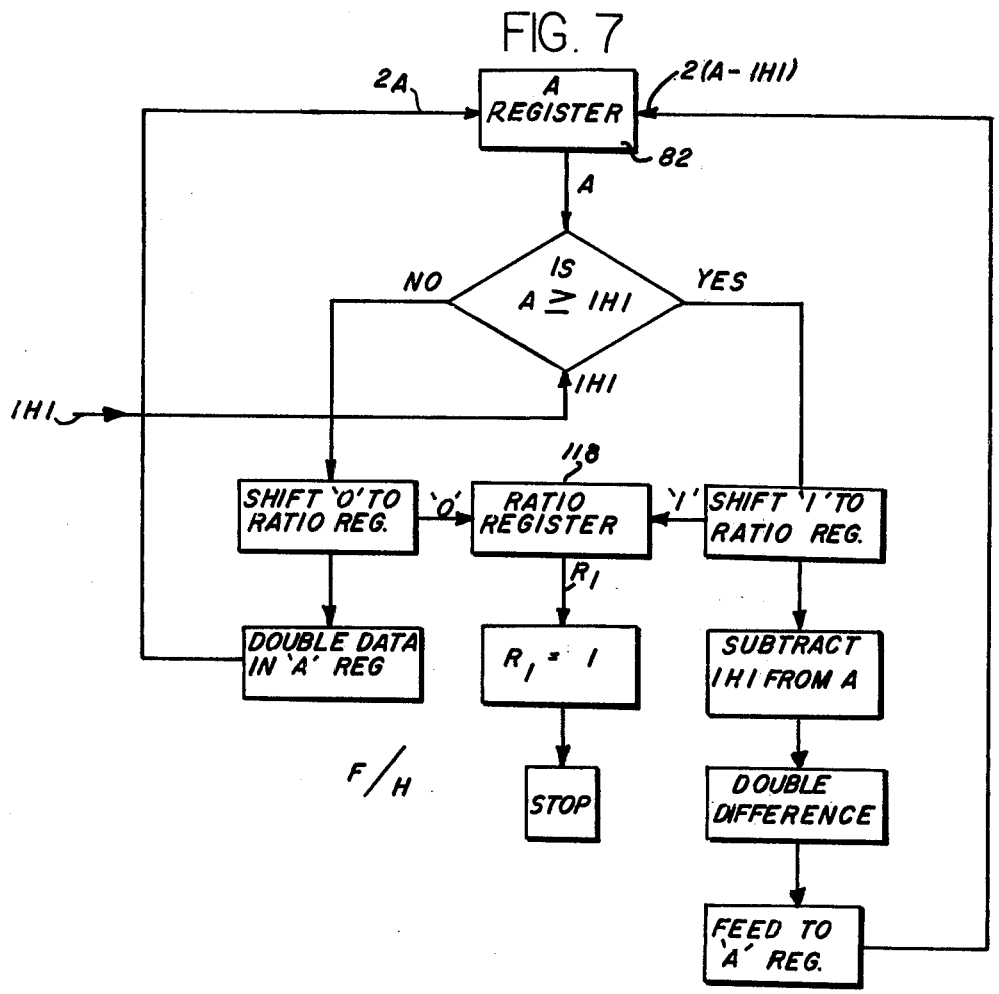

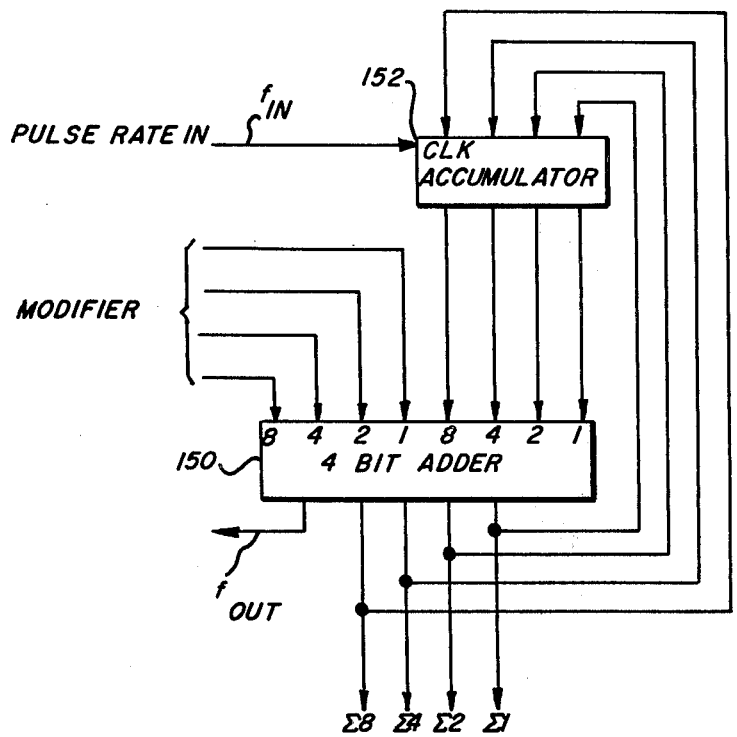
FIG. 8
FIG. 9
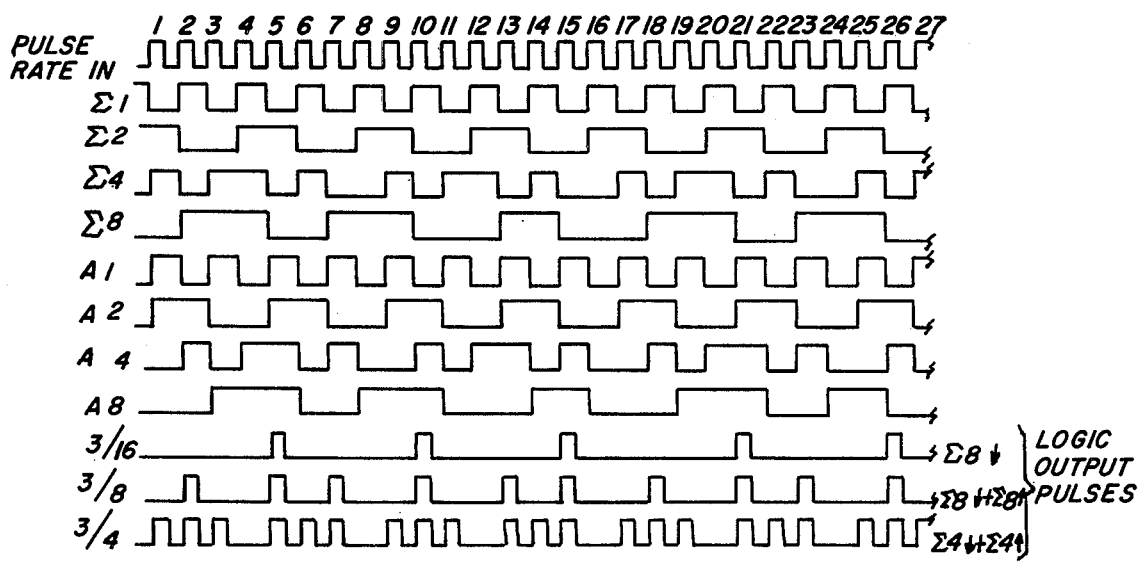

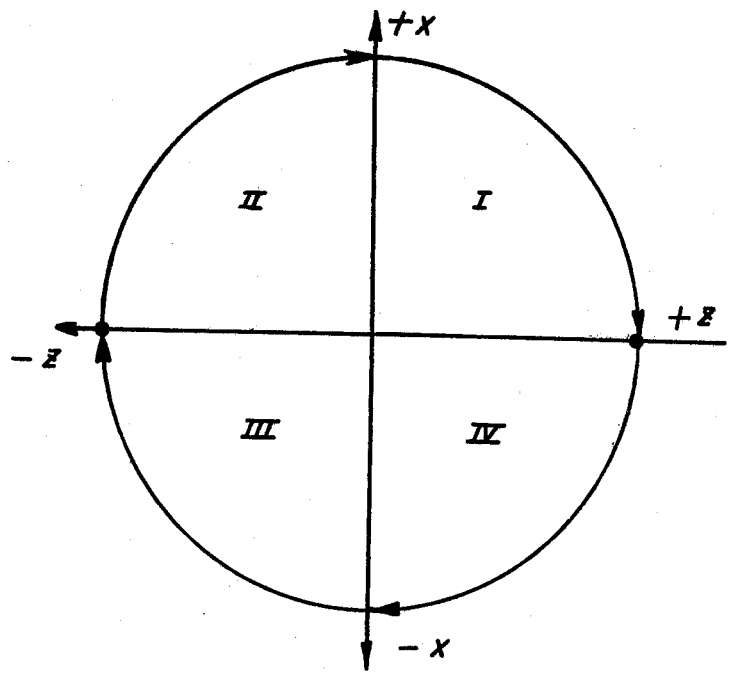
FIG. 12
FIG. 13
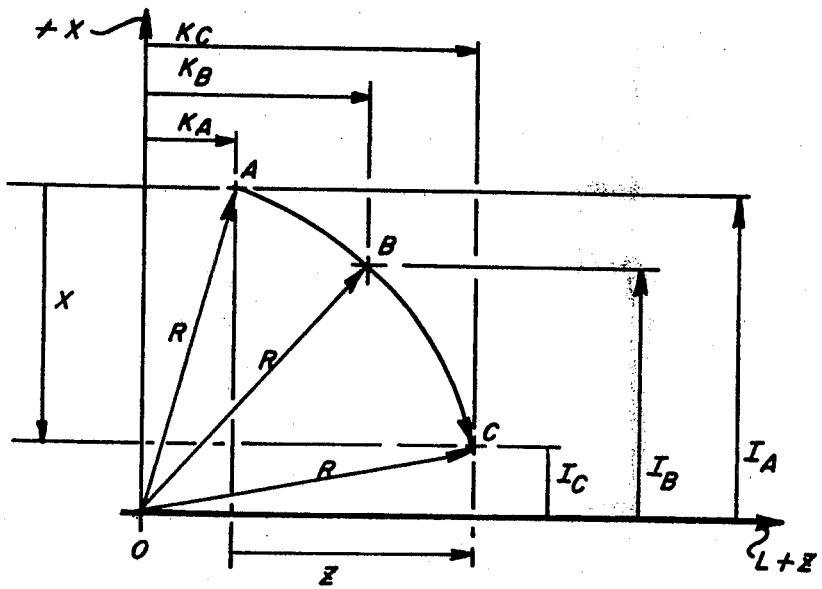

IMPROVED FEED RATE GENERATOR FOR MACHINE TOOL CONTROL

This invention relates to the art of machine tool control and more particularly to improvements in providing feed rate pulses for use in controlling movement of a machine tool.

The present invention is particularly applicable for use in calculating the feed rate number FRN in a machine tool control system from the programmed feed rate velocity F and the programmed slide departure distances along mutually perpendicular axes. In the example presented herein, the control is discussed in conjunction with a two axes movement of a cutting tool relative to a workpiece with the two axes being mutually perpendicular and referred to hereinafter as axes X and Z. The invention may be employed in other applications, such as for controlling movement of a machine tool along three mutually perpendicular axes.

It has been known in the art to provide a programmed feed rate number FRN which represents the ratio of the desired vectorial velocity to the vectorial summation of the intended departure distances along mutually perpendicular X and Z axes. This requires a precalculation of the vectorial summation. More recently, it has been proposed in the art that the feed rate number should not be programmed. Instead, the programmed information includes the desired vectorial velocity along with the desired departure distances. Since the feed rate number is not precalculated, some means must be provided for determining its value. This requires knowledge of the vectorial summation of the programmed departure distances. For a two axis control system, this may be referred to as the hypotenuse H, where H is the square root of the sum of the squares of the programmed departure distances along the X and Z axes. Since the feed rate number FRN is expressed as a ratio of the desired vectorial velocity, or feed rate F, to the hypotenuse H, the value of the ratio F/H must be determined. This ratio is the feed rate number FRN and is used to modify a pulse train to a lower pulse rate to provide feed rate pulses used in controlling movement of the machine tool.

Previous proposals in the art for determining the feed rate number FRN from the programmed vectorial velocity F and the programmed departure distances have not directly calculated the square root of the sum of the squares of the programmed distances. Instead, the vectorial summation, or hypotenuse H, has been obtained from a look up table, such as a read only memory, for providing values of the vectorial summation based on given values of the programmed departure distances. Other proposals have included employing separate digital computing means for computing the vector summation based upon a computer program. Still other proposals have provided estimates of the vectorial summation wherein certain constraints are employed, such as where at least one of the programmed departure distances is always equal to or greater than the other. In addition, these previous proposals have not provided means for directly calculating the value of the ratio of the vectorial velocity to the hypotenuse to obtain the feed rate number. Instead, they have employed multi-stage circuits wherein the complement or inverted value of one of these factors has been used to modify a pulse train which is then further modified by the other factor.

It is an object of the present invention to provide an improved feed rate generator for controlling a machine tool wherein the feed rate generator employs circuitry for directly calculating a function of the vectorial summation from the programmed departure distances.

It is a still further object of the present invention to provide an improved feed rate generator having circuitry for directly calculating the ratio of a function of the vectorial velocity to that of a function of the vectorial summation.

It is a still further object of the present invention to provide a machine tool control system employing hypotenuse calculating circuitry for directly calculating the value of the sum of the squares of signals having values which are functions of the programmed departure distances.

It is a still further object of the present invention to provide a machine tool control having a feed rate generator employing circuitry for normalizing the programmed departure distances and then calculating the value of the square root of the sum of the squares of the normalized departure distances to provide an output representation of the normalized vectorial summation.

It is a still further object of the present invention to provide a ratio calculator for receiving a signal representing the programmed vectorial velocity and a signal representing the normalized vectorial summation of the programmed departure distances and directly calculating therefrom the value of the ratio of the normalized vectorial velocity to the normalized hypotenuse.

In accordance with one aspect of the present invention, it is contemplated that programmed or commanded departure distances be presented calling for movement of a machine tool along mutually perpendicular first and second axes at a velocity in accordance with a commanded vectorial velocity. First and second signals are generated exhibiting values which are respectively a function, such as the normalized value, of the commanded departure distance along the first axis and of the commanded departure distance along the second axis. The value of the square root of the sum of the squares of the first and second signals is calculated and a third signal is provided having a value in accordance with this calculation. A fourth signal is then provided having a value corresponding to the ratio of a function, such as the normalized value of the commanded vectorial velocity to the third signal. This fourth signal is employed for purposes of varying the pulse rate of a pulse train to provide a train of pulses for use in controlling movement of the tool.

In accordance with another aspect of the present invention, a ratio calculator serves to directly calculate the ratio of the value of a function of the commanded vectorial velocity to the value of a function of the square root of the sum of the squares of the commanded departure distances and provide an output signal having a value in accordance with that of the ratio. This output signal is utilized in modifying the pulse rate of the train of pulses for use in controlling movement of the tool.

DESCRIPTION OF THE DRAWINGS

The foregoing and other objects and advantages of the invention will become more readily apparent from the following description of the preferred embodiments of the invention as taken in conjunction with the accompanying drawings which are a part hereof and wherein:

FIG. 3 is a simplified block diagram of the hypotenuse calculator;

FIG. 4 is a graphical illustration used in explaining the operation of the hypotenuse calculator;

FIG. 7 is a flow diagram illustration of the operation of the ratio calculator;

FIG. 8 is a block diagram illustration of an adder rate multiplier circuit employed in the function generator;

FIG. 9 presents graphical illustrations of wave forms used in illustrating the operation of the adder rate multiplier of FIG. 8;

FIG. 12 is a graphical illustration showing quadrants of a circle used in describing the operation of the function generator; and, FIG. 13 is a graphical illustration showing an arc of a circle and which is used in describing the circular interpolation operation of the function generator.

DESCRIPTION OF THE PREFERRED EMBODIMENTS

General Description

Figure 1:
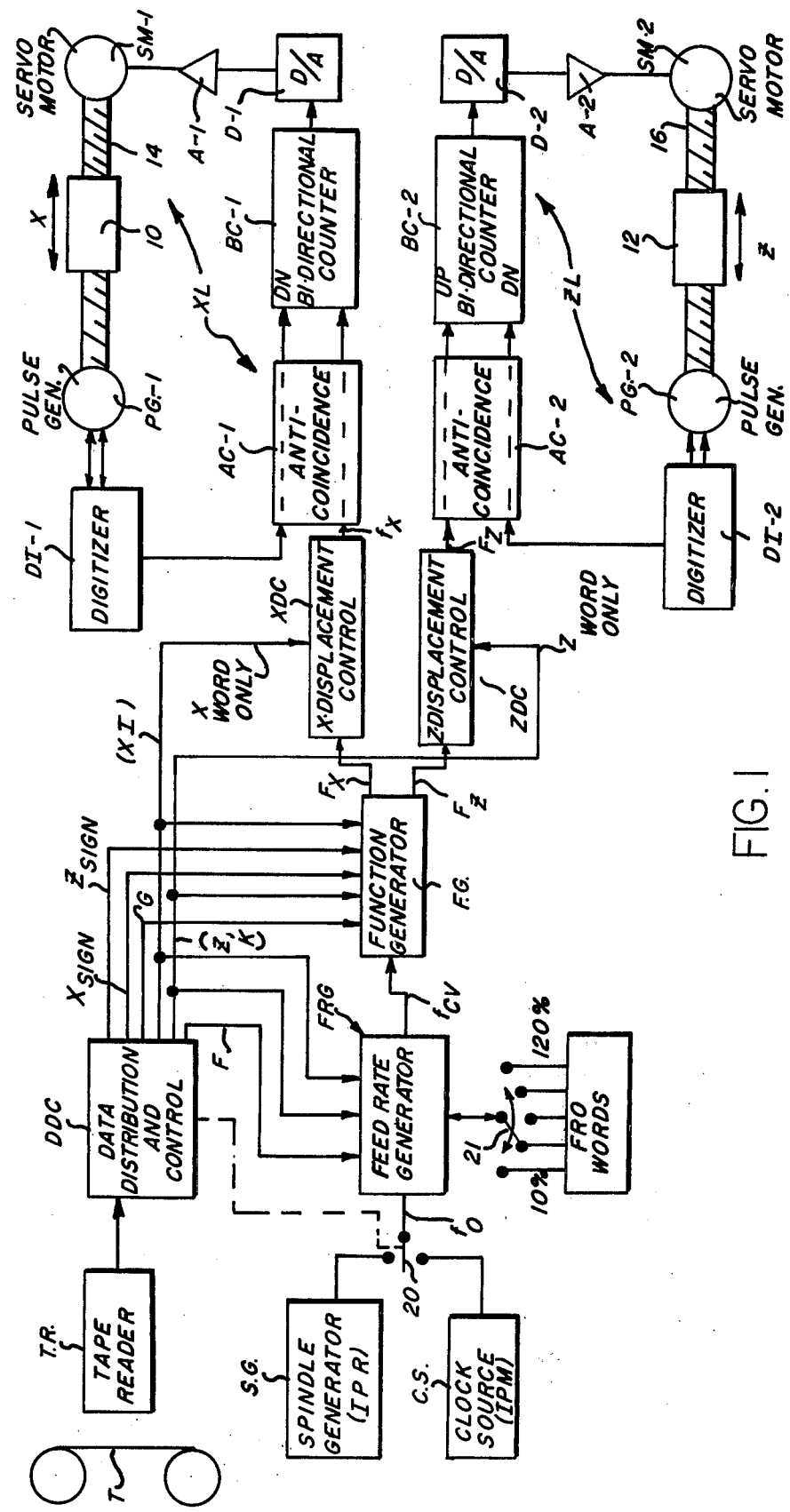
FIG. 1 is a block diagram illustration of one application of the present invention to a machine tool control system.

Reference is now made to the drawings wherein the showings are for purposes of illustrating preferred embodiments of the invention only and not for purposes of limiting same. FIG. 1 is a block diagram illustrating a machine tool control system embodying the present invention for purposes of controlling movement of a machine tool along mutually perpendicular axes X and Z. This is known as a two axis machine tool control system. One application for such a control system is in conjunction with controlling a two axis turning machine. Whereas the invention is described with respect to such a two axis machine, it is to be appreciated that the various features may be employed in other applications, such as for controlling a three axis machine.

It is contemplated that the machine to be controlled includes a cross slide 10 having a longitudinal slide 12 mounted thereon for respective movement along X and Z mutually perpendicular axes. As is conventional, these slides are driven simultaneously in response to pulses from a pulse source so that a cutting tool is moved along a path corresponding with the vectorial summation of movements of the slides 10 and 12 along the X and Z axes. This may be achieved by employing each slide in a digital control loop. As illustrated in FIG. 1, the X axis slide 10 is located in a digital control loop XL which includes a servo motor SM–1. This servo motor is drivingly connected to a lead screw 14, threaded to slide 10, for driving the slide at a velocity dependent upon the value of a digital error signal provided by a bidirectional counter BC–1. This digital error signal represents a pulse count and is converted into an analog representation thereof by means of a conventional digital-to-analog converter D–1. The magnitude of the analog signal controls the energization of the servo motor and hence, the angular velocity, neglecting load conditions. This causes a corresponding angular velocity of lead screw 14. The movement of slide 10 is at a linear velocity dependent upon the angular velocity of the lead screw and its pitch length.

A rotary pulse generator PG–1 may be connected to the lead screw 14, so as to be driven thereby, for purposes of providing a pulse train having a fixed number of output pulses for each revolution of the lead screw. Whereas the pulse generator PG–1 is illustrated herein as being a rotary pulse generator, other pulse generators may be employed, such as the linear feedback laser interfero-meter disclosed in the U.S. Pat. to Ralph H. Schuman, No. 3,648,276 assigned to the same assignee as the present invention.

The pulse generator PG–1 preferably includes two tracks in quadrature so as to provide two trains of feedback pulses which are applied to a digitizer DI–1. The digitizer DI–1 serves to combine the two pulse trains and determine therefrom the direction of angular rotation of the lead screw. The digitizer provides an output feedback pulse train having a fixed number of pulses per revolution of the lead screw and these feedback pulses are applied to one input of an anticoincidence circuit AC–1. Command pulses $F_x$ are also applied to the anticoincidence circuit and these are obtained from a function generator FG, to be discussed in greater detail hereinafter. These command pulses exhibit a pulse rate which dictates the velocity of slide 10. The command pulses $F_x$ and the feedback pulses from digitizer DI–1 are applied by the anticoincidence circuit AC–1 to the up/down bidirectional counter BC–1. The anticoincidence circuit AC–1 serves to prevent either a command pulse or a feedback pulse from being lost in the event that the two pulses occur simultaneously or overlap.

The up/down bidirectional counter BC–1 serves as an accumulating register to produce a digital position error signal. This is a function of the number of pulses applied to the up input and the number of pulses applied to the down input of the counter. The bidirectional counter provides a digital position error signal which is converted into an analog signal by the digital-to-analog converter D–1 and is then amplified by amplifier A–1 and supplied to control the servo motor SM–1. The slide 10 is then driven at a linear velocity along the X axis in dependence upon the magnitude of the error signal.

The digital control loop ZL for controlling movement of slide 12 along the Z axis by a lead screw 16, is structured and operates in the same manner as that discussed hereinabove with respect to the X axis control loop XL. Consequently, similar components in the two loops are identified with similar reference characters to simplify the description of the invention herein. The command pulses $F_z$ for the Z axis control loop are obtained from the function generator FG and the pulse rate dictates the linear velocity of slide 12 along the Z axis.

Each feedback pulse represents a basic incremental distance, such as 0.0001 inches. Similarly, each command pulse represents a basic incremental desired distance of movement, such as 0.0001 inches. For linear operation then, if the programmed departure distance for the X axis is representative of 3 inches, the X axis servo control loop XL will receive exactly thirty thousand command pulses from an X displacement control circuit XDC. As will be discussed hereinafter, this control circuit may take the form of a down counter which receives a displacement command for the programmed X departure distance and then meters the appropriate number of command pulses $F_X$ to the X axis control loop. A similar Z displacement control circuit ZDC meters command pulses $F_Z$ to the Z axis control loop.

Interpolator Circuitry

With reference to FIG. 1, the interpolator generally includes a feed rate generator FRG and a function generator FG. This is a pulse rate control system in that each command pulse $F_X$ or $F_Z$ commands a specific length of travel of a tool. For example, each command pulse may represent a commanded displacement of 0.0001 inch along an associated axis. The pulse rate of the command pulses commands a certain axis velocity. For example, one KHz pulse rate may represent a rate of 6 inches per minute. Although, in the preferred embodiment, the information is coded in binary format, it is to be appreciated that the circuitry employed may be used with binary coded decimal or straight decimal coded information.

The interpolator control circuit functions to reduce a high frequency input clock signal by programmed inputs to an output pulse rate proportional to the programmed inputs and to distribute these pulses to the X axis control loop XL and the Z axis control loop ZL to generate a programmed path. The high frequency input signal originates from one of two sources. The source depends upon whether the programmed operation is to be in terms of tool velocity as a function of time or tool velocity as a function of spindle speed. If the programmed operation is to be dependent on spindle speed in inches per revolution, then this will normally be referred to herein as an IPR operation mode. In the IPR mode, the basic pulse rate $F_0$ applied to the feed rate generator FRG will be obtained from a suitable spindle generator SG. On the other hand, if the programmed operation requires that tool velocity be a function of time, then this will normally be referred to hereinafter as an IPM operation mode. In the IPM mode, the basic pulse rate $F_0$ will be based on clock pulses obtained from a high frequency clock source CS.

The interpolator control circuitry reduces the basic pulse rate $F_0$ to a lower pulse rate in accordance with programmed inputs obtained from a data distribution and control circuit DDC and then distributes the command pulses $F_X$ and $F_Z$ to the X control loop XL and the Z axis control loop ZL.

The data distribution and control circuit DDC receives instructions from a conventional tape reader TR and then distributes commands to the interpolator control circuitry. The program itself may be recorded upon a suitable tape such as a multitrack, punched paper tape T which is read by a conventional tape reader TR. It is contemplated that the program will include blocks of information for various cutting operations. Each block may include a programmed desired vectorial velocity F which may be expressed in terms of inches per revolution IPR or in terms of inches per minute IPM. If the program requires IPR operation, then control circuit DDC actuates a suitable circuit, represented by a single pole, double throw switch 20 to connect the output of the spindle generator SG to the feed rate generator FRG so that the basic pulse rate $F_0$ is dependent upon spindle speed. On the other hand, if the operation commanded is IPM, then switch 20 is actuated to connect the clock source CS with the feed rate generator FRG so that the basic pulse $F_0$ is dependent upon that of the clock source.

Each block of information also includes X and Z words which provide command information dictating the commanded displacement of the slides along the X and Z axes, respectively. This is the normal incremental programming for use in linear interpolation. However, for circular interpolation, the X word is referred to as the I word and the Z word is referred to as the K word. For circular interpolation, the incremental distance from the center of the arc to be traced to the beginning of the arc as measured along the X and Z axes is programmed as the I and K words respectively. The arc center is the point about which the radius of the arc is rotated. Consequently then, the I word defines the address for the arc center offset as measured along the X axis and the K word represents the address for the arc center offset as measured along the Z axis.

In addition, each block includes a G word which serves as a preparatory command coded to call for such functional operations as linear interpolation, circular interpolation in a clockwise direction, and circular interpolation in counterclockwise direction. The G word along with an X sign and a Z sign are applied to the function generator FG for use in controlling circular interpolator operation. The structure and operation of the feed rate generator and function generator will be described hereinafter in greater detail.

Figure 2:
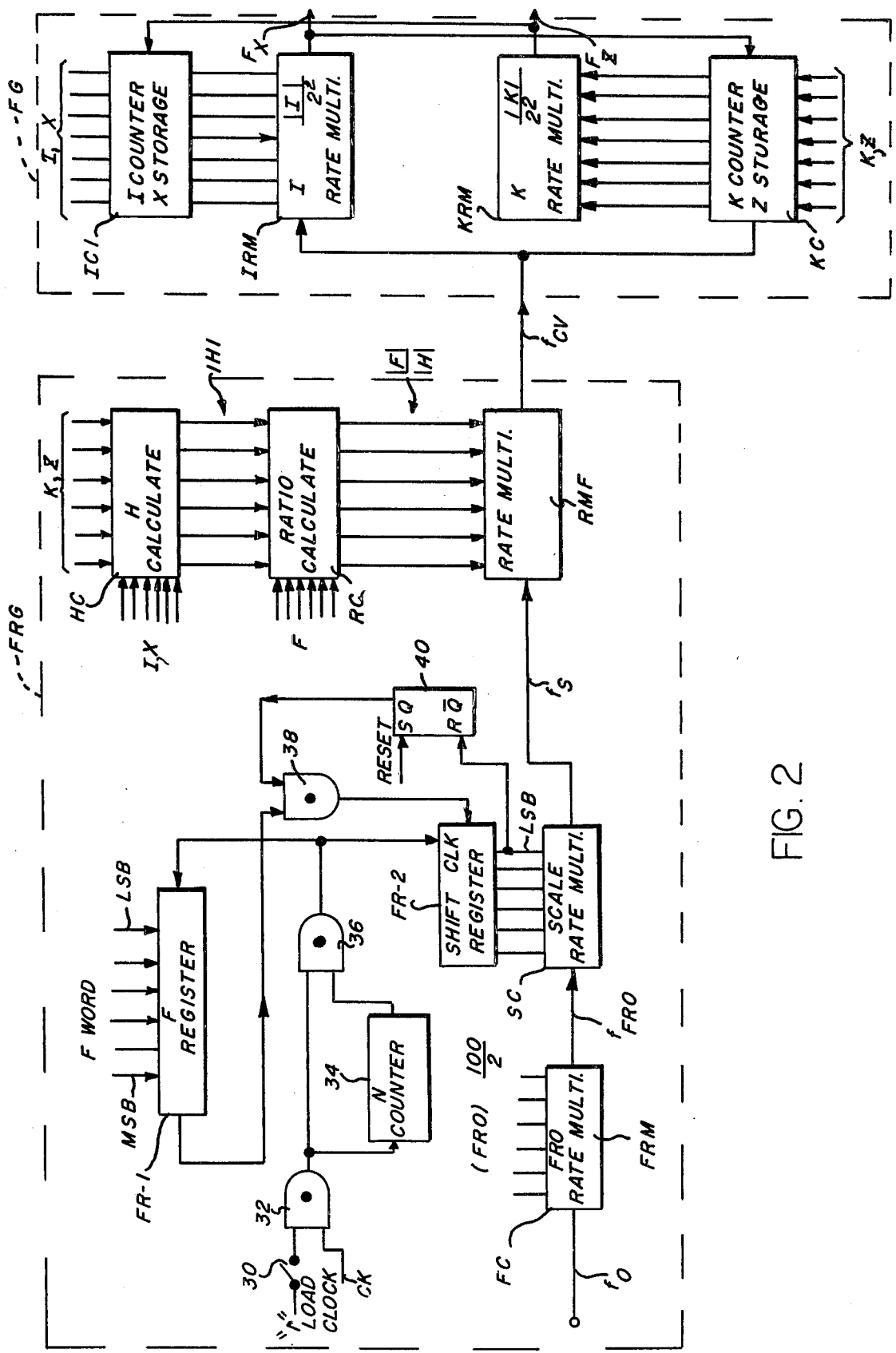
FIG. 2 is a schematic-block diagram illustration of the interpolator control circuitry constructed in accordance with the present invention.

Interpolator Control (FIG. 2)

Referring now to FIG. 2, the interpolator control circuit is illustrated in greater detail than that shown in FIG. 1. More specifically, the feed rate generator FRG includes a feed rate override control circuit FC which serves to receive pulses at the basic rate $F_0$ and reduce the pulse rate in manually selectable 10% steps from 0 to 120% of the programmed rate. The output pulse rate is referred to as $F_{FRO}$. This pulse train is then further reduced by a scaling circuit SC which serves to reduce the pulse rate by a factor for purposes of compensating for normalization techniques employed at a later point. The pulse rate of pulses obtained from the scaling circuit SC is referred to as pulse rate $F_S$.

Pulse rate $F_S$ is further reduced by a ratio rate multiplier RMF in dependence upon a modifier obtained from a ratio calculating circuit RC. The purpose of normalization and circuitry involved will be discussed in greater detail hereinafter. The ratio is the normalized vectorial velocity number /F/ to the normalized hypotenuse number /H/. The hypotenuse is the vectorial summation of the programmed X and Z displacements and is equal to the square root of the sum of the squares of the programmed departure distances. In linear interpolation, the X displacement word is treated as the I word and the Z displacement is treated as the K word. The hypotenuse calculator circuit HC receives the I word and the K word and then develops an output signal which is equal to the normalized hypotenuse /H/ which is a function of the actual hypotenuse H. The ratio calculator RC receives the F word and the normalized hypotenuse word /H/. The F word is normalized in the ratio calculator scaling circuit so that the output signal from the ratio calculator is proportional to the ratio of the normalized /F/ word to the normalized hypotenuse word /H/. This ratio is employed as a modifier by the rate multiplier RMF to reduce the pulse rate $F_x$ to a pulse rate $F_{CV}$. Pulse rate $F_{CV}$ serves as the cutter velocity pulse rate and is fed to the function generator FG.

The function generator FG, to be described in detail hereinafter, serves to receive pulses at the cutter velocity pulse rate $F_{CV}$ and distribute command pulses $F_x$ and $F_z$ to the X control loop XL and the Z control loop ZL. The function generator FG includes an I counter IC and a K counter KC which provide modifiers to an I rate multiplier IRM and to a K rate multiplier KRM. The I counter IC serves in linear interpolation as a means for storing the X word and similarly, the K counter serves in a linear interpolation for storing the Z word. In circular interpolation these counters operate as counters for generating an arc in accordance with the programmed arc center offset I word and K word. The I (or X) word is normalized so that the $F_x$ pulse rate is proportional to the product of a constant, the pulse rate $F_{CV}$ and the normalized /I/ word. Similarly, the K (or Z) word is normalized and used as a modifier for the K rate multiplier KRM such that the output pulse rate $F_z$ is proportional to the constant, the cutter velocity pulse rate $F_{CV}$ and the normalized /K/ word.

The output pulse rate $F_x$ or $F_z$ is an unnormalized pulse rate. This follows since, as will be appreciated from the discussion of normalization hereinafter, that the output of the scaling circuit SC is a pulse rate $F_x$ which, when multiplied by the ratio (/F/)/(/H/), provides an output pulse rate $F_{CV}$ which is proportional to the ratio of the unnormalized F word and the normalized hypotenuse /H/. When this pulse rate is multiplied by the normalized /I/ word at the rate multiplier IRM, the output pulse rate $F_x$ is proportional to the programmed vectorial velocity F and the ratio of the normalized /I/ word to the normalized /H/ word. The ratio of the normalized /I/ word to the normalized /H/ word is equal to the ratio of the unnormalized I word to the unnormalized H word and consequently, the output pulse rate $F_x$ is the unnormalized pulse rate. The same is true for pulse rate $F_z$.

For linear interpolation, the X displacement control XDC and the Z displacement control ZDC respectively receive an X word and a Z word. These controls may take the form of presettable down counters which are preset in accordance with the programmed displacement distances represented by the X word and the Z word. These circuits serve to meter the appropriate number of pulses at the pulse rate $F_x$ of $F_z$ to the respectively associated digital control loops XL and ZL.

In circular interpolation the I and K words represent the incremental distance from the center of the arc to the beginning of the arc, as measured along the X and Z axes. The arc center is the point about which the radius of the arc is located. The function generator is provided with a G word (see FIG. 1) which serves to command either clockwise or counterclockwise and the I counter serves as a counter and the K counter serves as a counter rather than storage registers, as in the linear mode of operation. The output from the K rate multiplier KRM is supplied as an input to the I counter and similarly the output of the I rate multiplier IRM is supplied as an input to the K counter. This circuitry serves to effectively trace an arc and its mode of operation and circuitry will be described in detail hereinafter.

Having provided a general description of the circuitry and mode of operation of the interpolator circuitry, attention is now directed to the following description which deals in greater detail with the specific circuitry employed and the operation involved.

Normalization

All of the data provided to the interpolator control circuitry is processed in the natural binary form in the embodiment of the invention illustrated herein. The F, I and K words may be obtained from the tape reader in BCD format. If so, it is contemplated that the words be converted to a natural binary form for use by the scaling circuitry in scaling the basic pulse rate $F_0$ to a lower pulse rate. These words are also normalized. This is done by shifting the binary numbers in registers such that the results fall within a fixed range of values. This is done for two reasons; namely, to reduce the amount of electronics required and yet maintain the required velocity accuracy, and to reduce the clock rates within the interpolator control. The normalized values are compensated for in the feed rate generator FRG and in the function generator FG.

In the feed rate generator FRG, the inputs i.e. the X, Z, I, and K words are normalized such that the larger number is between 1 and 2. In terms of IPM operation then, the calculated hypotenuse will be normalized between 1 and 2.828 inches. The hypotenuse is calculated each time displacement information is read into the interpolator control. The F word is also normalized with the use of a register such that it is shifted to a normalized value between 1 and 2. The ratio of the normalized /F/ word to the normalized hypotenuse word /H/ is calculated with the use of the ratio calculating circuit RC.

The interpolator data is processed in natural binary form. This may be accomplished, for example, by multiplying each X and Y commanded displacement by a factor of $10^4$ in order to convert any real numbers to natural decimal numbers. The result is then converted into a natural binary number and normalized (converted to a real binary number) in the hypotenuse calculator. For example, if the programmed real number for the X axis displacement is 3.0, the natural decimal number would be 30,000. Similarly, if the programmed Z axis real number is 4.0 inches, the natural decimal number would be 40,000. When a natural decimal number of 30,000 is converted into a natural binary number, the binary number is 111010100110000. This natural binary number when converted into a normalized (real) binary number is 0.111010100011. The rational decimal equivalent of this normalized binary number is the function 30,000/32,768 for a real decimal equivalent (approximately of 0.916). If a natural decimal number of 40,000 be converted into a natural binary number, the number would be 1001110001000000. The normalized real binary number would be 1.001110001. The rational decimal equivalent then is the fraction 40,000/32,768 for a real decimal equivalent (approximately) of 1.221. The hypotenuse calculation for this triangle then is 1.526 inches (real decimal equivalent of the normalized binary hypotenuse).

The programmed F word in IPM is multiplied by 10 to convert it a natural decimal number. This is then converted into a natural binary number and the natural binary number is normalized to produce a real binary number between 1 and 2. Table I below illustrated the conversion of an F word of 10.0 in IPM.

TABLE I

| Programmed F Word (IPM) | 10.0 |
|---|---|
| Natural Decimal Number | 100 |
| Natural Binary Number | 1100100 |
| Normalized (Real) Binary Number | 1.1001 |
| Rational Decimal Equivalent | $\frac{100}{64}$ |
| Real Decimal Equivalent | 1.563 |

The output of the ratio calculator then is the ratio of 1.563 to 1.526 or 1.024. The pulse rate is reduced in IPM by a still further factor of 4 so that the output frequency rate $F_{CT} = F_S ((1.024)/4)$.

In the function generator FG, the input pulse rate $F_{CT}$ is divided into two output pulse rates $F_X$ and $F_Z$. In the preferred form of the invention, the function generator does not employ counter rate multipliers for pulse rate modification. Instead, the function generator employs arithmetic circuits, to be described in detail hereinafter, to modify the pulse rates. Also, unlike the feed rate generator FRG, which normalizes by shifting the numbers the function generator preferably employs circuitry normalization by adjusting the denominator of the transfer equation. Adjusting the denominator effectively adjusts the size of the function generator to the displacements or radius programmed. The function generator employs adder-accumulator registers for modifying input pulse rates. Carry signals from selected bits of the function generator adders are used as output pulses. By selection of the proper carry bit used for the function generator output, the size (denominator of the transfer equation) is adjusted. The selection of the carry bit is determined by the size (most significant bit) of the larger of the two modifier inputs (I word and K word).

In the normalizing operation in the feed rate generator FRG, the decimal F word is always treated as a full four digit number without a decimal point. The F word is normalized by dividing it by an even binary multiple equal to or just less than the F number so that the normalized /F/ word is less than 2 and equal to or greater than 1. The denominator (next even binary multiple) is referred as to $2^m$. For example if the F word, when converted to a natural decimal number, is 1230, then the even binary multiple which is equal to or just less than the F number would be 1024. This is equal to $2^m$ where $m$ equals 10. The normalized /F/ word then would be the ratio 1230/1024, which is equal to 1.201171875, if carried out to 10 decimal places. In order to determine the denormalized F word, the normalized /F/ word must be multiplied by $2^m$; that is, F = (/F/) $2^m$. The scaling control circuit SC, as will be described hereinafter, multiplies the pulse train by $2^m$. When this factor $2^m$ is multiplied with the ratio (/F/)/(/H/), the output pulse rate $F_{CT}$ is proportional to the ratio of the unnormalized F word to the normalized hypotenuse word /H/. When this pulse rate multiplied by the normalized /I/ word in the function generator FG, the output pulse rate $F_X$ is proportional to the ratio of the normalized /I/ word to the normalized /H/ word multiplied by the unnormalized F word. Consequently then, this is essentially the same thing as stating that the output pulse rate $F_X$ is proportional to the ratio of the unnormalized I word to the unnormalized H word multiplied by the unnormalized F word.

In the following sections, detailed descriptions are presented with respect to the circuitry employed in the feed rate generator and the function generator. These descriptions will further discuss the manner in which the circuitry achieves normalization.

Feed Rate Override Circuit

Provisions are made for manual adjustment to achieve feed rate override in selectable 10% steps from 0 to 120% of the programmed rate. This is accomplished with the feed rate override circuit FC illustrated in FIG. 2. A feed rate override number FRO is supplied to a feed rate multiplier FRM for purposes of reducing the basic pulse rate $F_o$ in selectable 10% steps of the programmed rate. The output frequency from the rate multiplier is referred to as frequency rate $F_{FRO}$. The feed rate multiplier FRM may take any conventional form such as a 12 bit binary rate multiplier which basically is comprised of a binary up counter, called a multiplier counter, that counts the input pulses and gating circuitry, called multiplier gates, that gate the counter with a modifier input and the input pulses to produce an output frequency. All of the rate multipliers employed in the feed rate generator FRG may take this form. The modifier for the feed rate multiplier FRM is the feed rate override number FRO × 100 (indicative of 100%) and divided by a factor of 2. Consequently then, the total modifier applied to the multiplying input of the rate multiplier is (FRO) 100/2.

The feed rate override rate multiplier FRM may be a six bit multiplier and in such case, the binary pattern of the FRO word is a six bit binary pattern. The binary pattern is representative of the percentage override desired in 10% steps. The pattern may be selected by an operator manipulating a switch to supply a selected binary number for a selected FRO word. This may be implemented in the manner as shown in FIG. 1 wherein a switch arm 21 is illustrated as being selectively engageable with one of a plurality of circuits each of which provides a binary FRO word for application to the feed rate multiplier FRM. It is to be appreciated that such FRO words would include modification so that the FRO word is in effect multiplied by 100 and divided by a factor of 2. Consequently then, with a six bit feed rate override rate multiplier, the output frequency $F_{FRO}$ is proportional to $F_o$ (FRO)/($2^7$) 100.

Feed Rate Scaling Circuit

The feed rate scaling circuit SC provides compensation for the F word normalization which takes place in the feed rate generator. As will be recalled from the discussion dealing with normalization, the normalized /F/ word may be denormalized by multiplying it by $2^m$ which is equal to the next lower even binary multiple to the binary F word. This follows because the normalized /F/ word is equal to the binary F word divided by $2^m$. This scaling circuit is illustrated in FIG. 2 to which attention is now directed.

The scaling circuit SC includes a twelve bit scaling rate multiplier SRM for receiving a modifying number $2^m$. This rate multiplier is a 12 bit rate multiplier and has a numeric base of $2^{12}$. Consequently then, the scaling rate multiplier serves to multiply pulse rate $F_{FR0}$ by the ratio of $2^m$ to $2^{12}$, or $F_{FR0} (2^m)/(2^{12})$.

The factor $2^m$ is found by using only the most significant bit of the binary F word. This is accomplished in the embodiment of the invention illustrated herein by applying the binary F word as a 12 bit word to a 12 bit, parallel to serial shift register FR-1. This shift register receives the F word as a parallel input and upon receipt of shift input pulses provides a bit serial output with the most significant bit being shifted first and the least significant bit being shifted last. In shifting this binary number from the F register FR-1, the most significant bit $2^m$ is detected as the bits are shifted into a serial to parallel shift register FR-2. This operation is commenced upon closure of a suitable load actuating switch represented herein by a normally open switch 30. Closing switch 30 causes a binary 1 signal to enable an AND gate 32. This permits AND gate 32 to pass clock pulses from a suitable clock source CK. Clock source CK may be associated with clock source CS or may be a separate source of clock pulses. These clock pulses from source CK are used as shift pulses for shifting the F word from register FR-1 into register FR-2. It is only necessary that the 12 bits of the F word be shifted and consequently, only 12 clock pulses need to be provided. This may be accomplished with the use of a presettable pulse counter 34 which serves to enable an AND gate 36 for a count of N, where N corresponds to 12 pulses. This permits AND gate 36 to pass twelve pulses. Thereafter, the N counter 34 disables AND gate 36. The output pulses from AND gate 36 are applied to a clock or shift input of register FR-2 so that a bit serial pulse train may be entered into this twelve bit register. The clock pulses are also applied to the shift input of register FR-1 so the bit pattern stored in register FR-1 is shifted one bit at a time with the most significant bit being shifted first. The output from the register FR-1 is applied through a normally enabled AND gate 38 to register FR-2.

As the bit pattern from register FR-1 is being shifted into register FR-2, a flip-flop 40 operates to detect the location of the most significant bit of the F word. This is accomplished by connecting the output of the least significant bit stage of register FR-2 to the reset input of flip-flop 40. Consequently then, when the first significant bit of the F word is shifted into register FR-2, the flip-flop 40 will be reset to disable AND gate 38. The AND gate then will carry a binary 0 level signal at its output and this signal is applied to the input of register FR-2. Thereafter, each clock pulse applied to the clock input of register FR-2, will shift a binary 0 level signal into the register. Only one bit position of register FR-2 will have a logic one level signal when the shift operation is completed. The 12 bit output pattern from register FR-2 provides a modifier binary number of $2^m$ and this is used in scaling the pulse rate $F_{FR0}$ with the scaling rate multiplier SRM.

Hypotenuse Calculator

The hypotenuse calculator serves to calculate the hypotenuse of the right triangle formed by the X and Z displacements in linear interpolation or the I and K arc center offsets in circular interpolation. In the preferred embodiment of the invention, to be described in detail with reference to FIG. 5, the inputs to the hypotenuse calculator are normalized so that the larger number is between 1 and 2. However, before dealing with the specific circuitry employed in FIG. 5, reference is made to FIGS. 3 and 4 which respectively present a simplified block diagram illustration of the hypotenuse calculator together with a graphical illustration of the operation.

The hypotenuse calculator includes a presettable down counter IDC which is initially set to count condition in accordance with the number represented by the programmed I word. The calculator also includes a presettable up counter KUC which is initially set to a count condition corresponding with the K word. As will be discussed hereinafter, these counters are preferably multistage binary counters, although for the purposes of this discussion, they may be considered as decimal counters. The down counter IDC has its output applied to a pulse rate multiplier RM-1 for purposes of multiplying an input frequency signal $F_{in}$ by the count in the down counter to obtain an output pulse rate $F_D$. Similarly, the up counter has its output applied to an associated rate multiplier RM-2 for purposes of multiplying the input frequency rate $F_{in}$ by a modifier in dependence upon the count in the up counter to obtain an output frequency rate $F_u$. The output frequency $F_u$ from the up counter rate multiplier RM-2 is applied to the count input of the presettable down counter whereas the output frequency $F_D$ from the down rate multiplier RM-1 is applied as an input to the up counter KUC. During operation, the input frequency pulses $F_{in}$ are applied to both rate multipliers RM-1 and RM-2. The up counter KUC counts in an upward direction for each pulse in accordance with the pulse rate $F_D$. The down counter counts down one increment for each pulse applied thereto at a pulse rate $F_u$. A zero detect circuit ZD serves to monitor the output of the down counter IDC and operates to stop clock pulses $F_{in}$ from being applied to the rate multipliers when the count condition of the down counter has reached a zero count status. At this point, the count status of the up counter KUC is a count representative of the value of the hypotenuse H. That is, once the zero detect circuit has detected a zero count condition of the down counter IDC, the count status of the up counter KUC is a value equal to the square root of the sum of the squares of the initial counts preset into the down counter and the up counter.

This operation may be more readily understood from an examination of the graphical illustration of FIG. 4. If the initial count for the X axis be represented by $X_0$ and that for the Z axis be represented by Z, then a right triangle having a hypotenuse H is defined. The vector representation of H describes a point $X_0 Z_0$ on an arc of the circle having a radius signal to H. As the down counter counts down and the up counter counts up, the point defined by the end of the vector traces an arc of a circle. When the down counter has reached a zero count, the value of X is zero. At this point, the hypotenuse H is equal to the final value of the Z count in the up counter.

Detailed Description of Hypotenuse Calculator Circuitry

Figure 5:
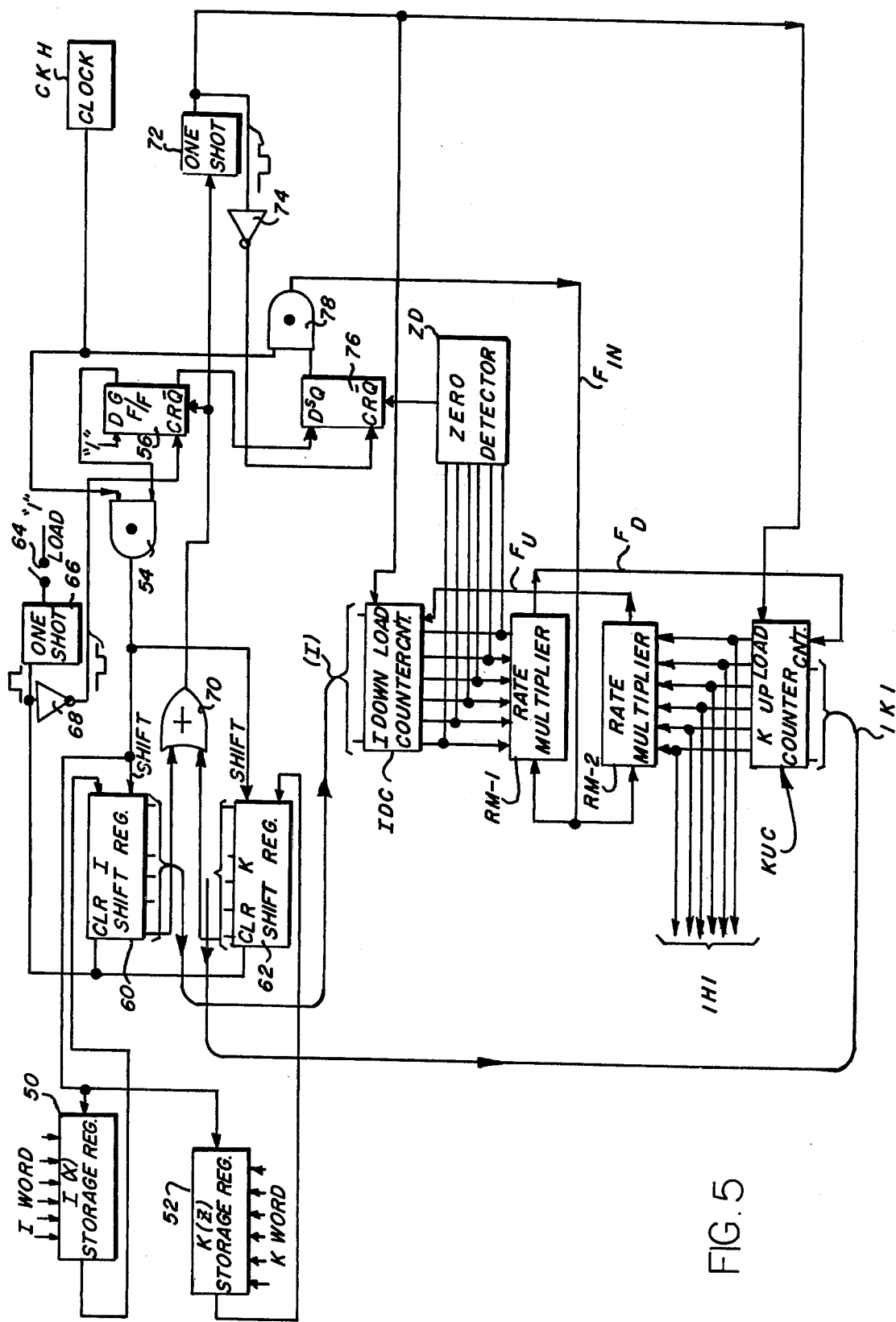
FIG. 5 is a schematic-block diagram illustration of the hypotenuse calculator.

In the preceding discussions, the hypotenuse calculator HC was discussed with reference to a simplified showing and did not include normalization of the information data. Preferably, the invention is practiced by employing a hypotenuse calculator which includes normalization and a preferred embodiment of the calculator is illustrated in FIG. 5. For purposes of simplifying an understanding of the invention, the comparable circuits in FIGS. 3 and 5 are labeled with like character references.

The I word and the K word obtained from the tape reader by means of the data distribution and control circuit may be stored in parallel to serial storage registers 50 and 52 of FIG. 5. The number of bit stages employed is dependent upon the accuracy of resolution required in the operation. For example, each storage register may take the form of a 20 bit storage register. The I word and the K word stored in registers 50 and 52 are stored as natural binary numbers. Each of these registers is operative as a shift register to shift the stored binary number in bit serial sequence with the most significant bit being shifted first and the least significant bit being shifted last in synchronism with shift pulses applied to the respective shift inputs of the registers. These shift inputs are clock pulses obtained from a clock source CKH. This clock source may be incorporated in a master clock that includes the clock source CS or the clock CK described herein with reference to FIG. 2. The pulse rate of the shift pulses from the clock source CKH may be relatively high, such as on the order of 5.6 mHz. The shift pulses from clock source CKH are applied to the shift inputs of registers 50 and 52 through an AND gate 54 when this gate has been enabled by a flip-flop 56. This flip-flop is normally in its reset condition to maintain AND gate 54 disabled. However, when AND gate 54 is enabled to supply shift pulses to registers 50 and 52, the contents of these registers are shifted in bit serial fashion and loaded into serial to parallel shift registers 60 and 62 respectively. During this process as will be discussed below, the I word and the K word are normalized.

The loading of shift registers 60 and 62 is commenced by providing a suitable load signal represented herein by closure of a normally open switch 64. This actuates a suitable one shot circuit 66 which applies a binary 1 pulse to the clear input of each of the registers 60 and 62. This is conventional in the art and serves to effectively reset the registers so that all bit positions are occupied by binary 0 level signals. This binary 1 pulse from the one shot circuit 66 is inverted by an inverter 68 which applies a momentary binary 0 pulse to the C input of flip-flop 56. This pulse has a negative going transition which is then followed by a positive going transition. The positive edge serves to actuate the flip-flop. This flip-flop may take various forms. Preferably, it takes the form known as a combined RS and D flip-flop. This type of flip-flop has a D input and a C input. The flip-flop also has a Q output and a Q output. In addition, the flip-flop is provided with a set input S and the reset input R. As is known, if a binary 1 level signal is applied to the D input, then upon application of a positive going pulse to the C input, the flip-flop will be actuated to a state wherein the Q output terminal carries a binary 1 signal and the Q terminal carries a binary 0 signal. Consequently then, the one shot circuit provides a positive pulse for purposes of clearing the shift registers 60 and 62 and the trailing edge of that pulse is used by flip-flop 56 to provide a binary 1 signal to enable AND gate 54. There is a slight time delay before AND gate 54 is enabled and this time delay is sufficient to permit the shift register 60 and 62 to be cleared.

With AND gate 54 being enabled by flip-flop 56, the shift clock pulses from clock source CKH are applied to the shift inputs of storage registers 50 and 52 as well as to the shift inputs of the I shift register 60 and the K shift register 62. The data in registers 50 and 52 is then simultaneously shifted in bit serial sequence into registers 60 and 62 respectively.

Normalization of the I word data and the K word data is achieved by an operation which includes detecting the most significant bit of the larger of the two words. This is achieved by connecting an OR gate 70 to receive the binary level signal of the most significant bit position of each register 60 and 62. Consequently then, when the most significant bit of the larger of the two words is shifted into the most significant bit position of its associated register 60 or 62, this condition is detected by OR gate 70 which applies a binary 1 signal to the reset input R of flip-flop 56. This causes the output of flip-flop 56 to change state so that the Q output terminal carries a binary 0 signal to disable AND gate 54 and thereby prevent further shift pulses from clock source CKH from being applied to registers 50, 52, 60 and 62.

While shifting the data from registers 50 and 52 into registers 60 and 62, the data is also loaded into the I down counter IDC and the K up counter KUC. That is, shift register 60 is a serial input to parallel output shift register for loading the I down counter. The K shift register 62 is also a serial input to parallel output shift register for loading the K up counter KUC. When the most significant bit of the larger of the two words I and K has been detected, flip-flop 56 is reset. This causes a one shot circuit 72 to apply a load triggering pulse to the load inputs of the I down counter IDC and the K up counter KUC so that the normalized /I/ word is loaded into the I down counter and the normalized /K/ word is loaded into the K up counter. These counters are now preset to count conditions corresponding with the normalized /I/ count and the normalized /K/ count. Preferably, the I counter and the K counter have the same number of bit positions as the I shift register and the K shift register respectively. In the example being given, each counter is a 12 bit binary counter. The 12 bit binary pattern representing the count status of each counter is applied to an associated rate multiplier for purposes of reducing an input pulse rate to a lower pulse rate. In the case of the I down counter IDC, its output is applied to a twelve bit binary rate multiplier RM-1 whereas the output of the K up counter is applied to an associated binary rate multiplier RM-2. The output pulse rate from the rate multiplier RM-1 is applied as input count pulses to the count input of the K up counter where the output pulse rate of rate multiplier RM-2 is applied as count pulses to the count input of the down counter.

The calculating operation is commenced after the I counter and the K counter have been loaded. One shot circuit 72 applies a positive pulse to cause this loading operation. This output pulse is inverted by an inverter 74 so that a momentary binary 0 pulse is applied to the C input of a flip-flop 76. Since flipflop 56 is in its reset condition, it applies a binary 1 signal to the D input of flip-flop 76. Consequently then, on the trailing or positive going edge of the binary 0 signal pulse from inverter 74, flip-flop 76 is actuated. This causes a binary 1 signal to be applied by its Q output to enable an AND gate 78. This AND gate then passes clock pulses from the clock source CKH which serve as the input frequency rate $F_{in}$ to the rate multipliers RM-1 and RM-2.

The down counter IDC will now count down in accordance with the pulse rate of the pulses obtained from the up counter rate multiplier RM-2 while the up counter KUC counts in an up direction in accordancee with the pulse rate of the pulses provided by the down rate multiplier RM-1. As discussed hereinbefore with reference to the showing in FIG. 3, when the down counter has obtained a count condition of zero, the count provided by the up counter KUC is of a value corresponding with the normalized hypotenuse /H/. This condition is detected with zero detector ZD connected to the output of the down counter IDC. Once a zero count condition has been detected, the zero detector ZD applies a trigger pulse to reset flip-flop 76 and thereby disable AND gate 78 to prevent further pulses from being applied to the rate multipliers RM-1 and RM-2. The output of the up counter KUC is a 12 bit binary signal and is of a value corresponding with the normalized hypotenuse /H/. This signal is now used by the ratio calculator RC for purposes of calculating the ratio of the normalized /F/ word to the normalized /H/ word.

Ratio Calculator

Figure 6:
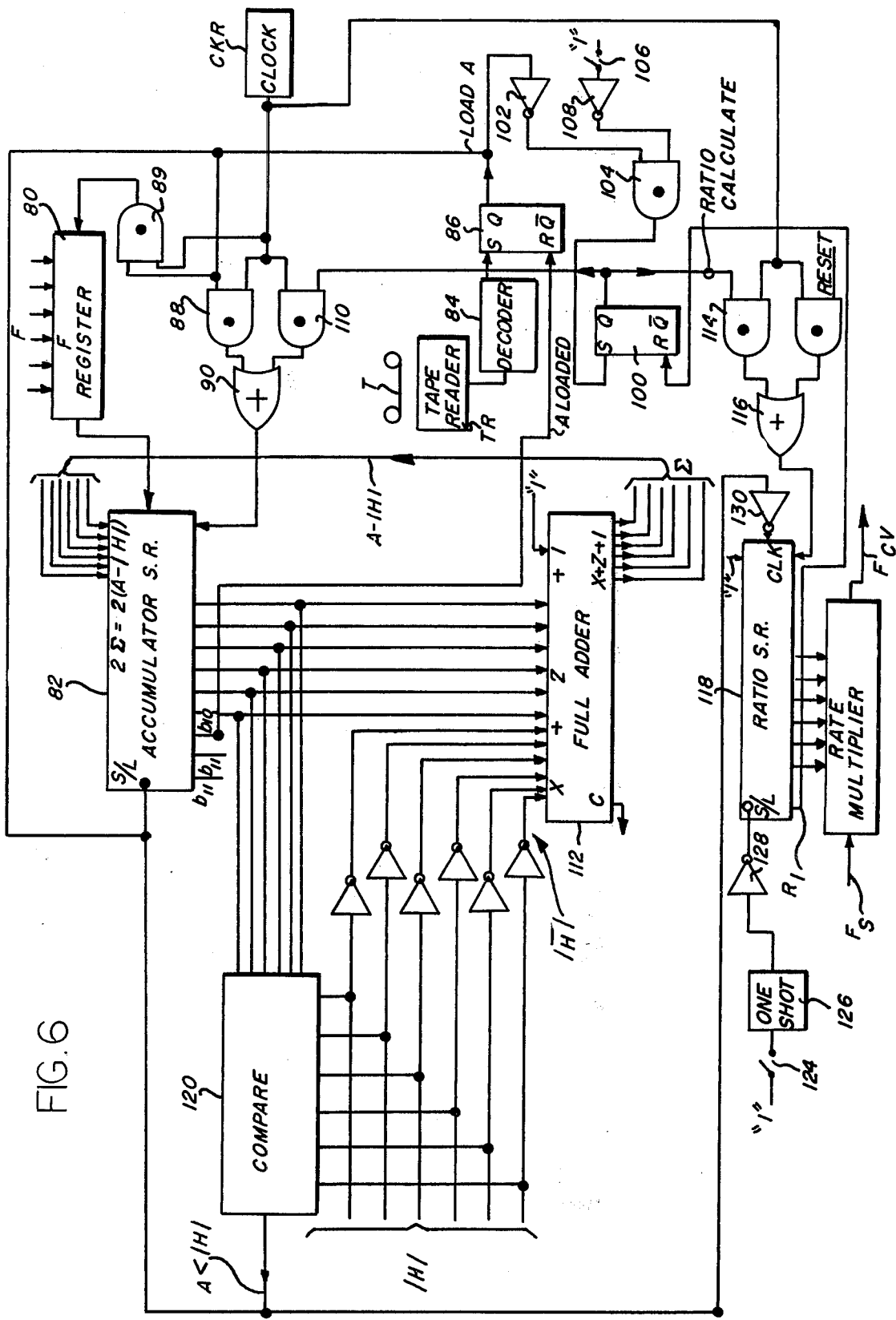
FIG. 6 is a schematic-block diagram illustration of the ratio calculator.

The ratio calculator RC (FIG. 2) calculates the ratio of the normalized /F/ word to the normalized hypotenuse word /H/. The circuitry employed to perform this calculation preferably takes the form as that as illustrated in FIG. 6 to which attention is now directed.

The F word is stored in natural binary form in a parallel input to serial output storage register 80. The input supplied to the register may be supplied from the data distribution and control circuit DDC in accordance with information read by the tape reader TR. Register 80 may be a conventional 12 bit parallel input to serial output shift register which serves to provide an output in bit serial fashion as clock pulses are applied to the shift input of the register. The output pattern presents the most significant bit first and the least significant bit last. The F word stored in register 80 is shifted in bit serial sequence into an accumulator shift register 82 when the shift load input S/L receives a binary 1 signal. This accumulator shift register is conventional in the art and may receive a binary signal for storage with the signal being received in bit serial fashion or with the signal being received in bit parallel fashion. The mode of operation depends upon whether a binary 1 signal or a binary 0 signal is applied to the shift-load input S/L. When a binary 1 signal is applied to this input, one bit of information is shifted into the shift register in series fashion for each clock pulse applied to the clock input of the shift register. When a binary 0 signal is applied to this shift-load S/L, a multiple bit binary signal is shifted in parallel for storage when a clock pulse is applied to the clock input CLK.

The operation of the ratio calculator may commence once the accumulator shift register 82 has been loaded with the F word and the hypotenuse calculator has completed its calculation. Information in the F shift register 80 may be shifted into register 82 on command from various sources. In the embodiment illustrated, the tape reader TR serves to decode an end of block EOB designation by means of a decoder 84 and in response thereto, sets a flip-flop 86. This flip-flop then provides a load A signal which indicates that the accumulator shift register is to be loaded. The accumulator register will hereinafter be frequently referred to as the A register. The load A signal is applied as a binary 1 signal to the shift-load input S/L of the accumulator register 82 to condition the register to receive the F word in bit serial fashion. The load A signal also enables AND gates 88 and 89. This permits clock pulses from a suitable clock source CKR to be passed by AND gate 89 to register 80 and by AND gate 88, through an OR gate 90 to register 82. Clock source CKR may be a portion of a master clock which also includes clock sources CS (FIG. 1) or CK (FIG. 2) or CKH (FIG. 5). As the clock pulses are applied to registers 80 and 82, the F word is shifted in bit serial fashion from register 80 into register 82. The F word is normalized when shifted into register 82 by detecting when the most significant bit of the F word is located at a particular bit position of the 12 bit accumulator register 82. The selected bit position for this 12 bit register is bit position 10. Consequently, when this bit position is occupied by a binary 1 level signal, an output taken from this position of the accumulator register serves to reset flip-flop 86. This removes the load A signal to prevent further shift pulses from being applied to register 80. In this manner, the F word from register 80 has been loaded into register 82 and normalized.

The calculating operation of the ratio calculator commences when a flip-flop 100 is set. This may be accomplished in various ways. In the embodiment illustrated herein, when flip-flop 86 is in its set condition, its Q output provides a load A signal. This is a binary 1 signal and is inverted by an inverter 102 to disable an AND gate 104 and thereby prevent flip-flop 100 from being set. Once the accumulator has been loaded, flip-flop 86 is reset and its output terminal Q provides a binary 0 signal. This is inverted by inverter 102 to enable AND gate 104. This condition is indicative that the F word has been loaded in accumulator register 82. The ratio calculation also requires that the normalized hypotenuse word /H/ has been calculated (FIG. 5). Consequently, during the time that the hypotenuse calculator is performing its calculating operation, it is desirable that flip-flop 100 not be in its set condition to cause a ratio calculation. This may be accomplished by employing a switch which serves to disable AND gate 104 so long as the hypotenuse is being calculated. In the embodiment illustrated, this is illustrated by a simple normally open switch 106 which is actuated to a closed condition during the hypotenuse calculation operation to apply a binary 1 signal which is then inverted by an inverter 108 to disable AND gate 104. Once, however, the accumulator register 82 has been loaded and the hypotenuse calculation has been completed, both inputs to AND gate 104 are satisfied and flip-flop 100 is actuated to its set condition. When this flipflop is in its set condition, its output terminal Q carries a binary 1 signal indicative of a command for ratio calculate. This binary 1 signal is applied by flip-flop 100 to enable an AND gate 110 to pass clock pulses from clock source CKR to the clock input CLK of accumulator shift register 82. Since flip-flop 86 is reset, a binary 0 signal is applied to the shift-load input S/L of register 82. Consequently then, in the absence of other instructions, each clock pulse will cause a parallel loading of information into the register of the binary information from the sum output of a full adder 112 to be discussed hereinbelow.

When flip-flop 100 is set, it also enables an AND gate 114 to pass clock pulses from the clock source CKR through the AND gate and thence, through a succeeding OR gate 116 to the clock input of a ratio shift register 118. This register is constructed somewhat similar to that of the accumulator register 82 in that it includes provisions for receiving information shifted therein in series or in parallel. Thus, register 118 has a shift-load input S/L. When the signal level applied to this input is at a binary 1 level, the ratio register 118 will be loaded in parallel for each clock pulse applied by OR gate 116 to the clock input. The ratio register 118 is initially preset to place a binary 1 level signal in its least significant bit position. This may be implemented by permanently connecting the parallel input for the least significant bit stage to a binary 1 source. This may be accomplished, as illustrated in FIG. 6, wherein a simple normally open switch 124 is actuated to apply a binary 1 level signal to a one shot circuit 126. The one shot circuit then applies a momentary binary 1 signal pulse which is inverted by an inverter 128 to apply a binary 0 signal pulse to the shift load input S/L of register 118. As will be appreciated from the following description, during the calculating operation, information bits are shifted from right to left in register 118, as viewed in FIG. 6, until the preset binary 1 bit has been shifted to the left to a position which is identified herein as output stage $R_1$. This corresponds with the most significant bit stage. When the preset binary 1 signal has been shifted to position $R_1$, a reset signal is applied to the reset input of flip-flop 100 to indicate that the ratio calculation has been completed. The output obtained from the ratio shift register 118 at that point in time will correspond with the ratio of the normalized /F/ word to the normalized hypotenuse /H/. This is employed as a modifier for the feed number rate multiplier RMF for purposes of scaling the pulse rate $F_S$ to a lower pulse rate $F_{CF}$.

The full adder 112 is a conventional binary adder circuit and effectively provides a subtraction process wherein the value represented by the normalized /H/ word is subtracted from the value in the accumulator for each clock pulse. This is done with binary level signals and to accomplish the subtractive process, an addition process is carried out. The ones complement of the normalized /H/ word is applied to the X input of the full adder. The accumulator contents are applied to the Z input of the adder. A binary 1 carry in signal is applied to the carry in position by wiring the carry input to a binary 1 source. The carry output of the full adder is not employed in this operation. The summation output of the adder value of corresponding with $A + 1 + /H/$. This corresponds with the value of $A - /H/$, where $A$ is the value of the binary contents of the accumulator 82. This summation signal is applied as a parallel input to the accumulator and its value is doubled by wiring each bit output to the next higher bit input of the accumulator.

Depending upon the results of a comparison made by comparator 120 of the value of the normalized /H/ word and the value of the accumulator register contents, the output sum of the full adder is doubled and entered into the accumulator, or the contents in the accumulator register is doubled by shifting the contents by one position to the next most significant bit position.

To facilitate an understanding of the manner of operation of the ratio calculation circuitry RC, attention is now directed to FIG. 7 which presents a flow diagram illustrating the operation of the circuitry of FIG. 6. In following the description, it will be useful to refer to both FIGS. 6 and 7 simultaneously. The ratio calculation commences once clock pulses are applied through AND gate 114 and OR gate 116 to the clock input of the ratio shift register 118. The ratio clock signal is also provided as a clock to the accumulator register through AND gate 110 and OR gate 90. The information in the accumulator register is shifted one position to the left to double the value of its contents or the contents will be changed by supplying thereto in parallel format signal corresponding with twice the summation of the output of the full adder; that is, $2(A - /H/)$.

For each clock pause, the comparator serves to compare the contents of the A register or accumulator 82 with the value represented by the normalized hypotenuse word /H/, obtained from the hypotenuse calculator (FIG. 5). If the value of the contents of the A register is less than that of the normalized hypotenuse /H/, then comparator 120 provides a binary 1 signal on its output. If the comparison indicates that the value of the contents of the A register is equal to or greater than that of the value of the normalized hypotenuse /H/, the comparator provides a binary 0 signal. The binary level of this signal is applied to the shift/load input of the accumulator register 82 to control its mode of operation. When a binary 1 signal is applied to this input, a parallel load operation is instituted whereby a signal corresponding with $2(A - /H/)$ is entered into the accumulator. If a binary 0 signal is applied to this input S/L, then on the next clock pulse applied to the input of accumulator 82, its contents are shifted one place to the left to double its value.

If the first comparison indicates that the value of the contents of the A register is less than that of the normalized hypotenuse /H/, comparator 120 applies a binary 1 signal to cause the accumulator to be parallel loaded and have its contents updated to the value of $2(A - /H/)$. At the same time the binary 1 signal from comparator 120 is inverted by an inverter 130 so that a binary 0 signal is shifted into the first bit position of the ratio shift register 118 (the previously preset binary 1 signal is shifted one position to the left).

When the value of the contents of the accumulator is equal to or greater than the value of the normalized hypotenuse, then the comparator 120 provides a binary 0 signal. This commands the accumulator to double its contents on the next pulse applied to its clock input by shifting the bit pattern therein one position to the left. In addition, the binary 0 signal provided by the comparator 120 is inverted by inverter 130 so that a binary 1 signal is shifted into the first bit position of the ratio shift register 118.

This ratio calculation is continued until the most significant bit position $R_1$ of the ratio register 118 is at a binary 1 level. This indicates that the initially preset binary 1 signal at the least significant bit position has been shifted through the register. At this point, the value of the contents in the ratio shift register corresponds with the value of the ratio of the normalized /F/ word to the value of the normalized /H/ word. The operation now stops since a binary 1 signal is applied from the $R_1$ output of ratio register 118 to reset flip-flop 100 and thereby prevent further clock pulses from being applied to the registers. This ratio is used as a modifier in scaling down the pulse rate from $F_S$ to $F_{CF}$. As will be recalled from the previous description dealing with the scaling circuit SC, the output frequency $F_N$ is proportional to $2^m$ ($F_{FRO}$). Consequently then, the output frequency $F_{CV}$ of the feed rate number rate multiplier RMF is proportional to the ratio of the unnormalized F word to the normalized hypotenuse word /H/. This pulse train is applied to the function generator FG which interpolates the pulse train to provide the $F_X$ command pulses and the $F_Z$ command pulses.

Function Generator (In General)

The function generator FG divides the incoming pulse rate $F_{CV}$ into two output pulse rates which are supplied to the X and Z axes in the proper ratio to produce the programmed slope or radius. As illustrated in FIG. 2, the function generator employs an I rate multiplier IRM and a K rate multiplier KRM. These rate multipliers differ from those employed in the feed rate generator FRG. The rate multipliers in the feed rate generator FRG may be considered as being counter rate multipliers whereas those employed in the function generator FG may be considered as adder rate multipliers.

The input pulse rate to the function generator FG is the tool velocity rate $F_{CV}$. The modifier for the I rate multiplier is the number stored in the I counter and is the normalized /I/ word. Similarly, the modifier for the K rate multiplier KRM is the normalized /K/ word. The scaling, however, is further divided by $2^2$. Thus, the X axis pulse rate $F_X$ equals $F_{CV}$ (/I/)/4. In circular interpolation, the values of the normalized /I/ word and the normalized /K/ word will change as the control generates an arc. Consequently, the output pulse rates $F_X$ and $F_Z$ will not be constant in circular interpolation. For linear operation, the programmed X word is applied to the X displacement control counter XDC as a presettable count and then the counter counts down at the rate of $F_X$ to meter the proper number of pulses to the X axis control loop XL. Similarly, the count represented by the Z word is used to preset the Z displacement control down counter ZDC which then meters the proper number of pulses at the rate of $F_Z$ to the Z axis control loop ZL.

Having now briefly reviewed the overall operation of the function generator, attention is now directed to the circuitry employed.

Function Generator Rate Multiplier

Figure 10:
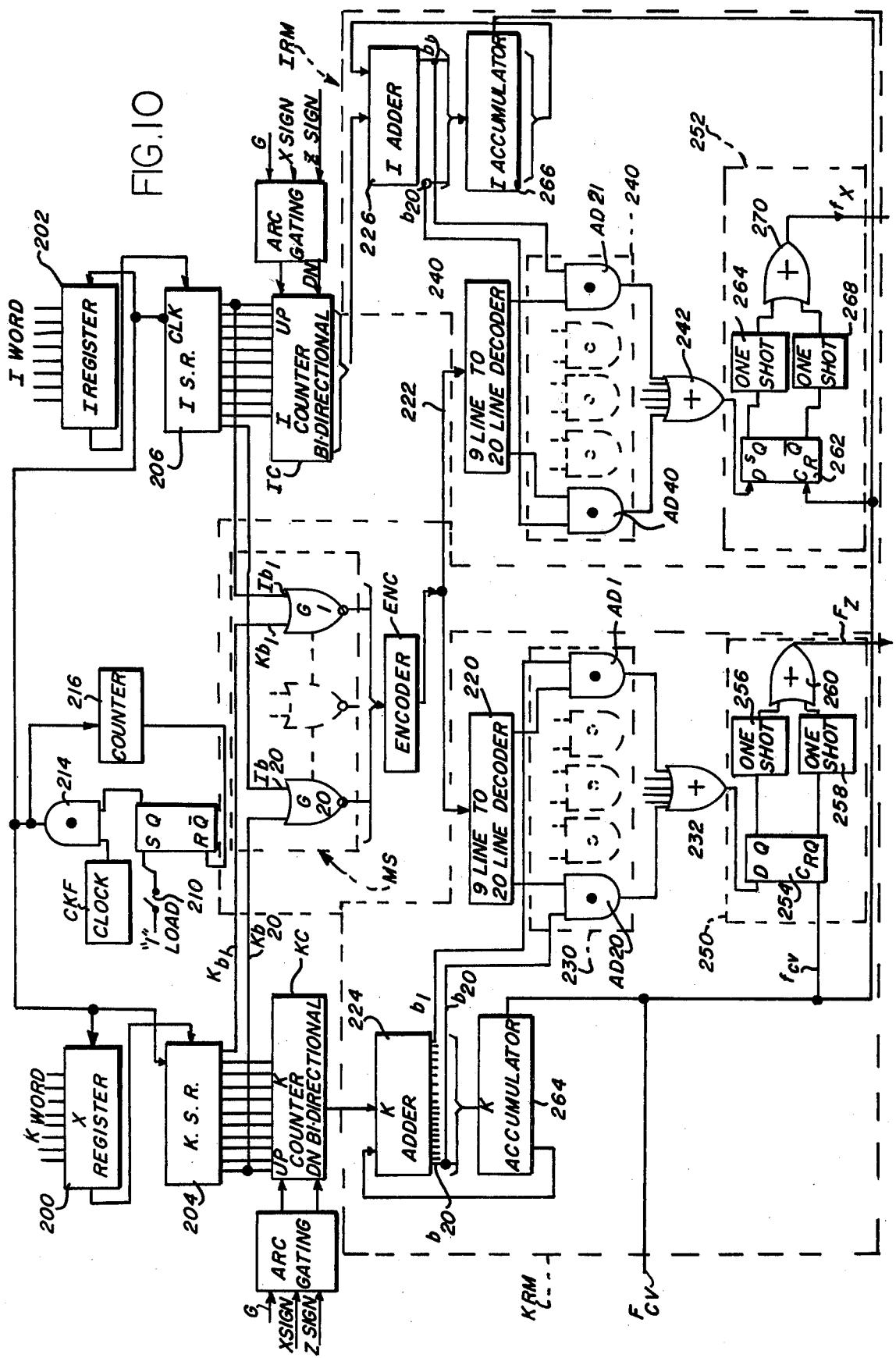
FIG. 10 is a schematic-block diagram illustration of the circuitry employed in the function generator.

Before describing the specific circuitry employed in the function generator illustrated in FIG. 10, attention is first directed to the adder rate multiplier illustrated in FIG. 8 and the accompanying wave forms of FIG. 9. The adder rate multiplier of FIG. 8 is illustrated as a 4 bit adder rate multiplier. In the description with reference to FIG. 9, the adder rate multiplier is described as a 20 bit adder rate multiplier.

As shown in FIG. 8, the adder rate multiplier includes a 4 bit binary adder 150 and a 4 bit accumulator register 152. Such a 4 bit adder and accumulator are, in themselves, conventional in the art. The 4 bit output pattern of the accumulator is applied as a 4 bit input to the adder along with a 4 bit modifier input $M_0$. The 4 bit sum output of the adder is applied as a parallel input to the accumulator register 152. Pulses at an input clock rate of $F_{in}$ are applied to the clock input of the accumulator and out pulses at a rate $F_{out}$ are obtained from the carry output of the adder. Each time the adder overflows, a carry output is provided as an output frequency pulse. Table II below illustrates the binary numbers present at the various locations of the 4 bit adder 150 of FIG. 8 with a modifier M of 3 and for a pulse train of 32 input pulses at the input frequency $F_{in}$.

TABLE II

4 Bit Adder Rate Multiplier With M=3; $F_{out}=F_{in}$ 3/16

| Number of $F_{in}$ Pulses ($\Sigma F_{in}$) | Accumulator Output (B) | Modifier (M) or (A) | Sum B + A or ($\Sigma$) | Number of $F_{out}$ Pulses (carry out) |
|---|---|---|---|---|
| 1 | 3 | 3 | 6 | |
| 2 | 6 | 3 | 9 | |
| 3 | 9 | 3 | 12 | |
| 4 | 12 | 3 | 15 | |
| 5 | 15 | 3 | 2 | 1 |
| 6 | 2 | 3 | 5 | |
| 7 | 5 | 3 | 8 | |
| 8 | 8 | 3 | 11 | |
| 9 | 11 | 3 | 14 | |
| 10 | 14 | 3 | 1 | 2 |
| 11 | 1 | 3 | 4 | |
| 12 | 4 | 3 | 7 | |
| 13 | 7 | 3 | 10 | |
| 14 | 10 | 3 | 13 | |
| 15 | 13 | 3 | 0 | 3 |
| 16 | 0 | 3 | 3 | |
| 17 | 3 | 3 | 6 | |
| 18 | 6 | 3 | 9 | |
| 19 | 9 | 3 | 12 | |
| 20 | 12 | 3 | 15 | |
| 21 | 15 | 3 | 2 | 4 |
| 22 | 2 | 3 | 5 | |
| 23 | 5 | 3 | 8 | |
| 24 | 8 | 3 | 11 | |
| 25 | 11 | 3 | 14 | |
| 26 | 14 | 3 | 1 | 5 |
| 27 | 1 | 3 | 4 | |
| 28 | 4 | 3 | 7 | |
| 29 | 7 | 3 | 10 | |
| 30 | 10 | 3 | 13 | |
| 31 | 13 | 3 | 0 | 6 |
| 32 | 0 | 3 | 3 | |

Examination of the table shows that a multiplier of 3/16 is obtained for this rate multiplier arrangement. Consequently then, three output pulses are obtained for every 16 input pulses or 6 output pulses are obtained for a pulse train of 32 input pulses. Normalization in the function generator is obtained by selecting a carry output signal depending on the magnitude of the larger of the I or K words. However, there is only one carry output obtained from a conventional four bit integrated circuit adder, such as the four bit adder illustrated in FIG. 8. Carries between bit stages are internal to the typical integrated circuits available and consequently, these carry outputs, if selected, must be generated from the sum outputs. Reference is now made to the wave forms illustrated in FIG. 9. These wave forms are presented for a four bit binary adder and accumulator as interconnected in FIG. 8 with a modifier having a decimal weight of 3. The sum outputs are employed to generate the carry signals. Specifically, an internal carry exists between sum output 4 and sum output 8 on each change in binary level at sum output 8, as either a rising edge or a falling edge. If a pulse is generated on the rising edge as well as on the falling edge of the signal level changes at sum output 8, then these pulses will represent the internal carry output of the adder between sum outputs 4 and 8. Thus, a carry signal, other than the carry from the last stage, may be generated by selection of the proper sum output of an adder employed in an adder accumulator arrangement as shown in FIG. 8. As will be brought out in detail hereinafter, the function generator provides normalization by selecting a carry signal proportional to the larger of the I and K inputs. Since the carry signal is actually available from only the last stage in a conventional integrated circuit adder, it is contemplated that a carry signal will be generated by selection of the appropriate sum output of the adder. By selection of the carry signal, the size (denominator) of the transfer equation is adjusted.

Function Generator (Detailed Description)

Reference is now made to FIG. 10 which illustrates the circuitry employed in the function generator FG in detail. The function generator includes an I counter IC which provides a modifier output to its associated rate multiplier IRM and a K counter KC which provides a modifier output to its associated K rate multiplier KRM. The I counter IC and the K counter KC are each twenty bit bidirectional up/down counters. In linear operation, each counter operates as a storage register for providing a fixed modifying to its associated rate multiplier. In circular interpolation, the normalized /K/ word and the normalized /I/ word are continuously changing. Each of the rate multipliers KRM and IRM is structured similar to that as illustrated in FIG. 8. But, these rate multipliers are adder rate multipliers employing a 20 bit adder and a 20 bit accumulator connected in essentially the same fashion as that discussed with reference to FIG. 8. The K counter and the I counter are loaded to receive binary signals representative of the programmed K word and the I word. It is contemplated that the K word is stored in a parallel input to serial output twenty bit shift register 200 and that the I word is stored in a similar parallel input to serial output 20 bit shift register 202. These words may be initially entered into these registers under the control of the data distribution and control circuit DDC. On command, these binary words are shifted from storage registers 200 and 202 into a K shift register 204 and an I shift register 206. The K shift register 204 loads the K counter KC and the I shift register 206 loads the I counter IC.

The operation may be commenced by applying shift pulses to registers 200, 202, 204, and 206. Closure of a normally open switch 210 applies a binary 1 signal to set a flip-flop 212. When this flip-flop is set, it enables AND gate 214 to pass clock pulses from a clock source CKF to the registers 200, 202, 204, and 206. Clock source CKF may be a portion of the master clock which incorporates previously mentioned clock sources CS, CK, CKH and CKR. Since a 20 bit word is stored in each register 200 and 202, only 20 bits need be shifted into registers 204 and 206. This may be implemented by employing a counter 216 which serves to count the clock pulses passed by AND gate 214 until 20 pulses have been counted and then provide a trigger signal to reset flipflop 212 and thereby disable AND gate 214.

The clock pulses passed by AND gate 214 are applied to the shift inputs of registers 200 and 202 as well as to the clock CLK inputs of the serial input to parallel output shift registers 204 and 206. As the clock pulses are applied to register 200 and 202, the binary words therein are shifted in bit serial sequence with the most significant bit being shifted first and the least significant bit being shifted last. Once the 20 bit I word and K word have been shifted into their associated shift registers, the corresponding I counter IC and K counter KC are loaded with the correct binary signals.

Function Generator Normalization

A sum output of each adder rate multiplier is selected based on the larger of the I and K words for purposes of normalization. This is accomplished by comparing the binary signals in the two shift registers 204 and 206 to determine the location of the most significant bit of the larger of the two words. Each bit position of register 204 is compared with the corresponding bit position of register 206 by connecting corresponding bit position output lines of each register to a two input NOR gate. For a 20 bit register system, the most significant bit selector circuit MS incorporates twenty NOR gates G1 through G20. For purposes of simplification, only NOR gates G1 and G20 are illustrated in FIG. 10, it being understood that the remaining gates are connected in a similar fashion. NOR gate G1 has two inputs, one taken from the least significant position of the I shift register 206 and the other being taken from the least significant bit position of the K shift register 204. NOR gate G20 has two inputs, with one being taken from the most significant bit position of register 204. Each NOR gate has a single output and the 20 outputs presented are applied to an encoder circuit ENC. This encoder is a 20 line to nine line encoder and serves to provide a nine bit binary signal which signifies the location of the most significant bit of the larger of the two binary words in registers 204 and 206. This nine bit signal is applied to a nine line to a 20 line decoder 220 in rate multiplier KRM and to a corresponding nine line to 20 line decoder 222 in rate multiplier IRM. These decoders select a particular one of the sum outputs of the K adder and the I adder for generating carry signals. The K adder is illustrated in FIG. 10 as being a 20 bit binary adder 224 having twenty sum outputs. Similarly, the I adder is illustrated as being a 20 bit binary adder 226 having twenty sum outputs. The carry outputs for the adders 224 and 226 are not used. Instead, the appropriate sum outputs are selected to provide a generated carry output in accordance with the magnitude of the larger of the I and K words.

In rate multiplier KRM, the nine line to 20 line decoder 220 provides a binary signal for selecting a particular one of the sum outputs of adder 224 to be effective. This is achieved by enabling a particular AND gate in an associated control circuit 230. Control circuit 230 is provided with twenty AND gates AD1 through AD20. Each AND gate has two inputs, one taken from decoder 220 and the other taken from a particular sum output of adder 224. Only one of the AND gates AD1 through AD20 will be enabled by one of the outputs taken from the nine line to 20 line decoder 220. The binary level at the corresponding sum output is passed through the enabled AND gate and thence through an OR gate 232.

The circuitry employed for sum bit selection in rate multiplier IRM is similar to that employed in rate multiplier KRM described above. Thus, a nine line to 20 line decoder 240 serves the same function as decoder 220 in that it decodes the bit pattern applied to it from encoder ENC and applies a binary 1 signal to one of 20 output lines extending from the decoder to a plurality of AND gates AD21 through AD40. These AND gates are respectively associated with one of the 20 bit positions of adder 226 with AND gate AD21 being associated with the least significant bit position and AND gate 40 being associated with the most significant bit position. Consequently, depending upon the nature of the signal provided by encoder ENC, one of the AND gates AD21 through AD40 will be enabled by the decoder 240. This will permit the binary signal at the associated sum output of adder 226 to be passed through the enabled AND gate and thence, through an OR gate 242.

The output pulses from OR gates 232 and 242 are applied to respectively associated frequency doubling and synchronizing circuits 250 and 252 respectively. Each of these synchronizing circuits serves to double the frequency of the pulses obtained from OR gates 232 or 242. Synchronizing circuit 250 employs a combined D type RS flip-flop 254 which has its D input connected to receive the pulses from OR gate 232 and its C input connected to receive the cutter velocity pulse rate $F_{CV}$. The Q and $\bar{Q}$ of flip-flop 254 are applied to one shot circuits 256 and 258 respectively. Each pulse from OR gate 232 has its leading and lagging edges detected. The one shots 256 and 258 provide two pulses for each pulse received from OR gate 232. These pulses are not concurrent in time and are passed by OR gate 260 to provide a command pulse rate $F_Z$. Similarly, frequency doubling and synchronizing circuit 252 also incorporates a flip-flop 262 and a pair of one shot circuits 264 and 268 respectively connected to the Q and $\bar{Q}$ outputs of flipflop 262 to provide output pulses on the leading and lagging edges of each output pulse obtained from OR gate 242. The pulses provided by one shot circuits 264 and 268 are not concurrent in time and are passed by OR gate 270 to provide the X axis command pulse rate $F_X$. The functional purpose of frequency doubling and synchronizing circuits 250 and 252 will become more apparent from the following description.

The larger of the I and K words is detected by the most significant bit detector circuit MS which provides a 20 bit pattern to encoder ENC. The encoder ENC provides a nine bit binary pattern signifying the location of the most significant bit of the larger of the two words. If the larger of the two words is the I word and its most significant bit is located at bit position 12, this would tend to indicate that the bit position to be selected for normalization would be sum bit 12 in each of the adders 224 and 226. However, in the selection of a sum output for generation of a carry signal, we must look to the sum output of the next higher stage and then double its frequency and this will provide us with the correct carry signal. Consequently then, we look to the next stage which, in the example given, would be bit position 13. The frequency is doubled by circuits 250 and 252. However, when the function generator is employed for circular interpolation, sufficient capacity must be provided for an increasing I or K word by a factor of approximately 1.4. Binary circuitry is employed and to achieve this capacity, we again double the frequency by looking at the next sum output of the adders. Thus, if the normalization procedure indicates that the most significant bit of the I or K word is at bit position 12 in the associated I or K shift register, the encoder ENC and the decoders 220 and 222 will select bit sum position 14 of the K adder 224 and the I adder 226. This is accomplished by enabling AND gate AD14 in circuit 230 and a corresponding AND gate AD34 in circuit 240.

Function Generator Operation

In operation, the K adder adds the value of the binary signal stored in the K counter KC with that of the associated K accumulator 264 each time a pulse is applied to the accumulator at the input frequency rate $F_{CV}$. Similarly, the I adder 226 adds the value of the binary signal stored in the I counter IC with that in the I accumulator 266 each time an input pulse at pulse rate $F_{CV}$ is applied to the accumulator. The accumulators 264 and 266 receive the outputs from their associated adders on the leading edge of each input pulse. That is, for each input pulse applied to the function generator, each accumulator will receive the sum output of its associated adder. This is in turn fed back to the associated adder where it is added again to the contents of the associated K counter or I counter. The output pulse rate is dependent on which sum bit outputs have been selected by the normalization techniques described above. That pulse rate is doubled by circuits 250 and 252 to provide the command pulses $F_Z$ and $F_X$.

For linear interpolation, the K and I counters operate as storage registers for storing the Z word and the X word. In circular interpolation, the modifiers presented by the I word and the K word in counters IC and KC are continuously changing since the counters operate as counters and not as storage registers. In FIG. 10, the K counter KC and the I counter IC are illustrated as being controlled by arc gating circuits in dependence upon command information including a G word, an X sign word, and a Z sign word. The function generator is partially reproduced in FIG. 11 together with the logic controls for controlling the counters for linear interpolation or circular interpolation.

The arc gating control circuit AGC receives a G word, an X sign word, and a Z sign word and decodes this information to control various gates to select whether the counters operate as storage registers or as counters. If they are to act as counters for circular interpolation, then one of the counters is actuated to operate as a down counter and the other is actuated to operate as an up counter. The gating control circuit also decides whether the pulse rate from the I rate multiplier or K rate multiplier is to be fed to the X axis control loop or the Z axis control loop.

Figure 11:
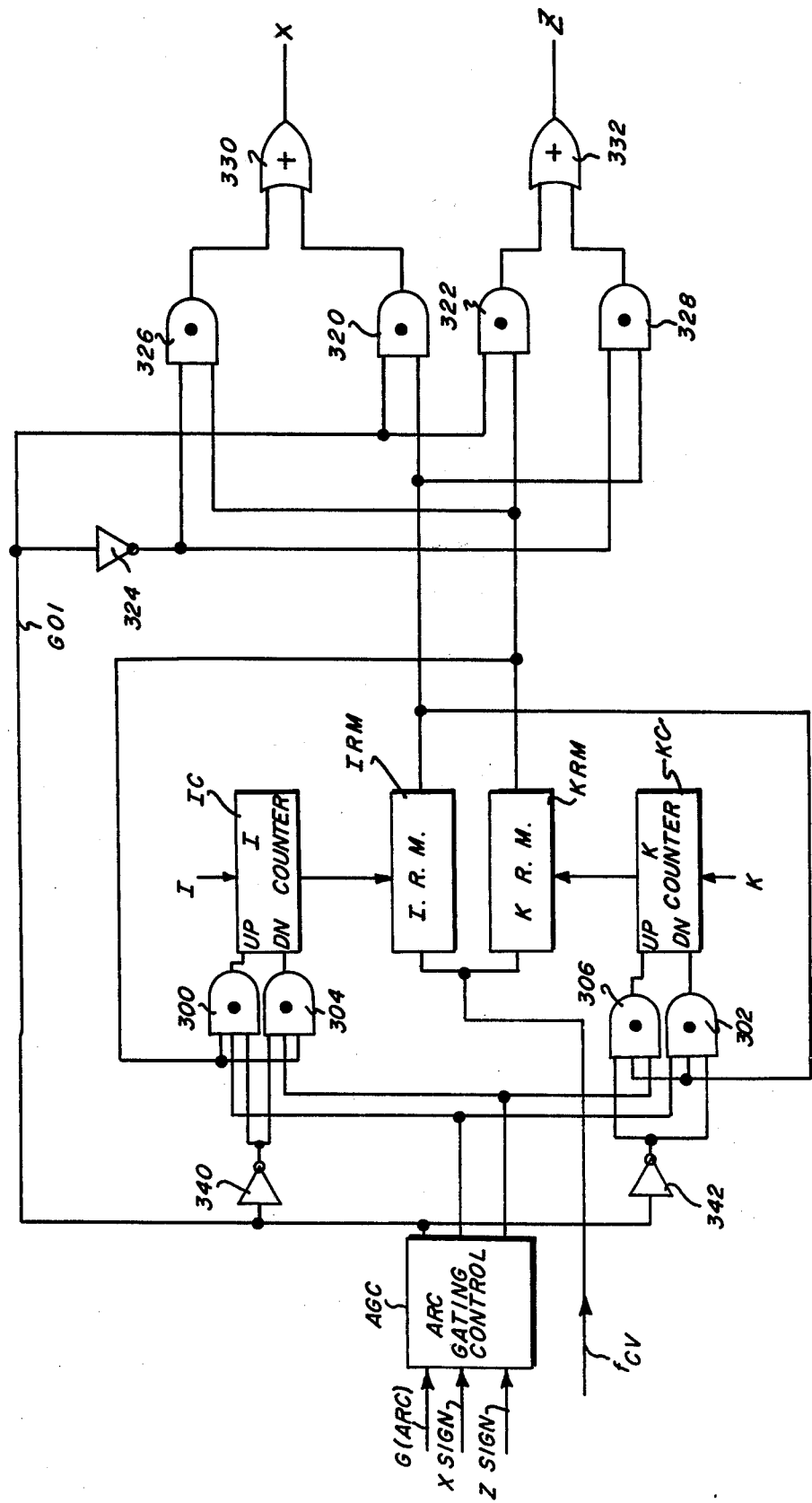
FIG. 11 is a schematic-block diagram illustration of the arc gating control circuitry employed in the function generator.

Referring now to FIG. 11, the arc control circuit AGC has three output circuits each of which carries a binary 1 or a binary 0 signal depending on the information provided by the G word, the X sign word and the Z sign word. One of these outputs is connected to one input each of AND gates 300 and 302. When all of the inputs to AND gate 300 are satisfied, it activates the I counter as an up counter to count pulses received from the K rate multiplier KRM. When all of the inputs to the AND gate 302 are satisfied, it activates the K counter KC as a down counter to count pulses received from the output of the I rate multiplier IRM.

A second output taken from the arc gating control circuit AGC is applied to one input each of AND gates 304 and 306. When all of the inputs to AND gate 304 are satisfied, it activates the I counter as a down counter to count the output pulses from the K rate multiplier KRM. Similarly, when all of the inputs to AND gate 306 are satisfied, it activates the K counter as an up counter to count the output pulses from the I rate multiplier IRM.

In linear interpolation, the output pulses from the I rate multiplier are fed to the X axis control loop XL and the output pulses from the K rate multiplier KRM, are fed to the Z axis control loop ZL. However, in circular interpolation the opposite is true. That is, regardless of whether the I counter serves as an up counter or a down counter, the pulses from its associated I rate multiplier IRM are fed to the Z axis control loop whereas the output pulses from the K rate multiplier KRM are fed to the X axis control loop. This may be accomplished by the circuitry illustrated in FIG. 11 wherein one output from the arc gating control circuit ARC carries a binary 1 signal whenever the program calls for linear operation. The G word code for this operation may be referred to as G01. This output of the arc gating circuit is applied to one input each of AND gates 320 and 322. The output is also inverted by an inverter 324 and applied to one input each of AND gates 326 and 328. Consequently, for linear operation AND gates 320 and 322 are enabled whereas AND gates 326 and 328 are disabled by inverter 324. On the other hand, this output from the arc gating control circuit is at a binary 0 level for circular interpolation operation. In circular interpolation, AND gates 320 and 322 are disabled and AND gates 326 and 328 are enabled. Output pulses passed by AND gates 320 and 326 are applied through an OR gate 330 to the X axis control loop XL. Output pulses passed by AND gates 322 and 328 are applied through an OR gate 332 to the Z axis control loop.

When the program calls for linear operation, the I counter and the K counter are prevented from operating as up or down counters. In such case, an inverter 340 disables AND gates 300 and 304 for the I counter IC. Also, an inverter 342 disables AND gates 302 and 306 for the K counter KC.

FIG. 12 illustrates four quadrants of a circle in an X, Z coordinate system. Table III below illustrates the operation of the arc gating control for generating an arc along the circle in a clockwise direction (CW) or in a counterclockwise direction (CCW).

TABLE III

| CODE | ARC | X SIGN | Z SIGN | I CTR. | | K CTR. | |
|------|-----|--------|--------|--------|---|--------|---|
| G02 | CW | + | + | up | Z | dn | X |
| G02 | CW | + | − | dn | Z | up | X |
| G02 | CW | − | + | dn | Z | up | X |
| G02 | CW | − | − | up | Z | dn | X |
| G03 | CCW | + | + | dn | Z | up | X |
| G03 | CCW | + | − | up | Z | dn | X |
| G03 | CCW | − | + | up | Z | dn | X |
| G03 | CCW | − | − | dn | Z | up | X |
| G01 | Linear | ± | ± | X | | Z | |

As shown in Table III, a G code word of G02 calls for an arc to be generated in a clockwise direction whereas a G code word of G03 calls for an arc to be generated in a counterclockwise direction. If both the X sign word and the Z sign word are positive, then this commands the I counter to count in an up direction with the output pulses from the I rate multiplier being applied to the Z control loop and the K counter counts down with the output pulses obtained from the K rate multiplier KRM being supplied to the X control loop. The arc direction in terms of the X and Z axes is indicated by the X sign word and the Z sign word. If the X sign word and the Z sign word are positive, the arc is in the second quadrant of FIG. 12. In the next illustration of Table III the X sign word is positive and the Z sign word is negative, representing that the arc be generated is in the third quadrant. The arc gating control circuit AGC decodes the G word, X sign word and Z sign word in accordance with Table III to control the operation of the I counter and the K counter and the distribution of the output pulses from the rate multipliers to the appropriate axis control loop.

To further facilitate an understanding of this aspect of the invention, reference is now made to FIG. 13 which illustrates the generation of an arc in the first quadrant (See FIG. 12). The I counter counts in a downward direction and the K counter counts in an upward direction. As the arc is being traced, the X word is continuously decreasing while the Z word is continuously increasing. For the illustration of FIG. 13, a program to generate such an arc may be written as G02, X-007, Z007, I009, K002, F01. The arc to be generated is from point A to point C, with point B being a typical intermediate point. The G02 word commands that a clockwise arc be traced. The X− indicates that the X sign word is negative and the Z (without a negative sign following it) indicates that the Z sign word is positive. This then describes the generation of the arc in the first quadrant. The value of the K word at point A relative to the arc center is indicated by K002, such as 2″. Similarly, the value of the I word at point A relative to the arc center is indicated by I009, such as 9″. The program word X007 indicates the distance along the X axis from point A to point C and this may be a negative value of 7″. Similarly, the distance along the Z axis from point A to point C is indicated in the program as Z007, such as 7″.

The arc center offset words I and K are entered into the I counter and the K counter respectively. The arc center gating control circuitry AGC interprests the programmed information in accordance with Table III and actuates the I counter to operate as a down counter and a K counter to operate as an up counter. During the generation of the arc from point A to point C, the value of the I word in the I counter IC will decrease and the value of the K word in the K counter KC will increase. As the I word decreases, it presents a changing modifier to the I rate multiplier IRM to vary the pulse rate of the output pulses from this rate multiplier which are fed to the Z axis control loop. Similarly, the K word in the K counter KC continuously increases during the generation of the arc and presents a changing modifier to the K rate multiplier to vary the pulse rate of the output pulses from this multiplier which are fed to the X control loop. This cross coupling produces an arc as shown in FIG. 13.

Although the invention has been described with respect to preferred embodiments, it is to be appreciated that the invention is not limited thereto as various modifications may occur to those skilled in the art within the scope of the appended claims.

I claim:

1. A control for controlling movement of a machine tool along a path in accordance with commanded departure distances along mutually perpendicular first and second axis and at a velocity in accordance with a commanded vectorial velocity wherein the path is dependent upon the vectorial summation of the commanded departure distances, comprising:

means for providing a train of pulses at a first pulse rate, means for generating first and second signals which have values which are respectively a function of the value of the commanded departure distance along said first axis and the value of the commanded departure distance along said second axis, means for receiving said first and second signals for directly calculating from the values of only said first and second signals and in accordance with a fixed format independently of the relative values of said first and second signals the value of the square root of the sum of the squares of the values of said first and second signals and providing a third signal having a value in accordance with said calculation, means for generating a fourth signal having a value corresponding to the ratio of a function of the value of the commanded vectorial velocity to the value of said third signal, and means for varying the pulse rate of said train of pulses in dependence upon the value of said fourth signal for use in controlling movement of said tool.

2. A control for controlling movement of a machine tool along a path in accordance with commanded departure distances along mutually perpendicular first and second axis and at a velocity in accordance with a commanded vectorial velocity wherein the path is dependent upon the vectorial summation of the commanded departure distances, comprising:

means for providing a train of pulses at a first pulse rate, means for generating first and second signals which have values which are respectively a function of the value of the commanded departure distance along said first axis and the value of the commanded departure distance along said second axis, means for receiving said first and second signals for directly calculating therefrom the value of the square root of the sum of the squares of the values of said first and second signals and providing a third signal having a value in accordance with said calculation, means for generating a fourth signal having a value corresponding to the ratio of a function of the value of the commanded vectorial velocity to the value of said third signal, and means for varying the pulse rate of said train of pulses in dependence upon the value of said fourth signal for use in controlling movement of said tool, said sqaure root calculating means includes means for receiving said first and second signals along with clock pulses at a fixed pulse rate and utilizing said clock pulses for incrementally varying the values of said signals in opposite directions until one has attained a value of zero, and output means for providing a said third signal in dependence upon the value of said other signal when said one signal has attained a value of zero.

3. A control for controlling movement of a machine tool along a path in accordance with commanded departure distances along mutually perpendicular first and second axes and at a velocity in accordance with a commanded vectorial velocity wherein the path is dependent upon the vectorial summation of the commanded departure distances, comprising:

means for providing a train of pulses at a first pulse rate, means for generating first and second signals which have values which are respectively a function of the value of the commanded departure distance along said first axis and the value of the commanded departure distance along said second axis, means for receiving said first and second signals for directly calculating therefrom the value of the square root of the sum of the squares of the values of said first and second signals and providing a third signal having a value in accordance with said calculation, means for generating a fourth signal having a value corresponding to the ratio of a function of the value of the commanded vectorial velocity to the value of said third signal, and means for varying the pulse rate of said train of pulses in dependence upon the value of said fourth signal for use in controlling movement of said tool, said calculating means includes a down counter settable to an initial count corresponding with the value of said first signal and an up counter settable to an initial count corresponding with the value of said second signal, means for providing clock pulses at a fixed pulse rate, first means receiving said clock pulses for supplying count pulses therefrom to said down counter to count down at a rate dependent on the product of the value of the count in said up counter and said fixed pulse rate, second means for receiving said clock pulses for supplying count pulses therefrom to said up counter to count up at a rate dependent on the product of the value of the count in said down counter and said fixed pulse rate.

4. A control as set fourth in claim 3, including zero count detecting means for detecting a zero count status of said down counter, and clock disabling means for preventing further clock pulses from being supplied to said first and second means.

5. A control as set forth in claim 3 wherein each said first and second means includes pulse scaling means for varying the pulse rate of said clock pulses in dependence upon the value of the count in its associated counter.

6. A control as set forth in claim 5 wherein each said scaling means is a pulse rate multiplier for receiving said clock pulses and reducing the pulse rate thereof by a factor depending upon the value of the count in the associated counter.

7. A control as set forth in claim 6 wherein each said counter is a multibit binary counter having a count input and each said pulse rate multiplier is a multibit binary pulse rate multiplier having a multiplier input for receiving a binary signal for multiplying the pulse rate of said fixed clock pulse rate by the value of said binary signal, each said counter having output circuit means for applying a binary signal having a value corresponding to its count condition to the multiplier input of an associated one of said rate multipliers, each said rate multiplier having output circuit means for applying its output pulses to the count input of the nonassociated binary counter.

8. A control for controlling movement of a machine tool along a path in accordance with commanded departure distances along mutually perpendicular first and second axes and at a velocity in accordance with a commanded vectorial velocity wherein the path is dependent upon the vectorial summation of the commanded departure distances, comprising:

means for providing a train of pulses at a first pulse rate, means for generating first and second signals which have values which are respectively a function of the value of the commanded departure distance along said first axis and the value of the commanded departure distance along said second axis, presettable down counter means for receiving count pulses and decreasing the count condition thereof for each received count pulse, means for presetting said down counter means to a count condition corresponding with the value of said first signal, presettable up counter means for receiving count pulses and increasing the count condition thereof for each received count pulse, means for presetting said up counter means to a count condition corresponding with the value of said second signal, a source of clock pulses exhibiting a fixed pulse rate, first means for receiving said clock pulses and applying count pulses derived therefrom to said down counter means at a pulse rate dependent upon said fixed clock pulse rate and the value of the count condition of said up counter means, second means for receiving said clock pulses and applying count pulses derived therefrom to said up counter means at a pulse rate dependent upon said fixed clock pulse rate and the value of the count condition of said down counter means, means for stopping the supply of said clock pulses to said first and second means when said down counter means attains a zero count condition, said up counter means having output circuit means for providing a third signal having a value corresponding with the count condition of said up counter means.

and means for varying the pulse rate of said train of pulses in dependence upon the value of said third signal when the supply of said clock pulses has been stopped.

9. A control as set forth in claim 8 wherein said clock pulse stopping means includes zero count detector means for detecting a zero count condition of said down counter and providing an output signal in dependence upon said detection.

10. A control as set forth in claim 9 including gating means interposed between said source of clock pulses and said first and second means for supplying said clock pulses thereto only when said gating means is enabled, gate control means for enabling said gating means to pass said clock pulses and being responsive to a said zero count detector output signal for disabling said gating means to prevent further clock pulses from being applied to said first and second means.

11. A control as set forth in claim 8 including means for generating a fourth signal having a value corresponding to the ratio of a function of the value of the commanded victorial velocity to the value of said third signal.

12. A control as set forth in claim 11 wherein said means for varying the pulse rate of said train of pulses includes means for varying said pulse rate in dependence upon the value of said fourth signal.

13. A control as set forth in claim 11 wherein said means for generating said fourth signal includes ratio calculating means for receiving said third signal and a fifth signal representative of the value of the said commanded victorial velocity and providing therefrom said fourth signal having a value in dependence upon the value of said fifth signal and said third signal.

14. A control as set forth in claim 10 wherein said first and second means are each a pulse rate multiplier for receiving said clock pulses and reducing the fixed pulse rate thereof by a factor depending upon the value of the count condition in the associated counter means.

15. A control as set forth in claim 10 wherein each said counter means is a multibit binary counter means for providing a binary output signal in dependence upon the count condition thereof, each said first means and said second means is a multibit pulse rate multiplier having a multiplier input for receiving a said binary output signal from its associated binary counter for multiplying the pulse rate of said fixed clock pulse rate by the value of said binary signal.

16. A control for controlling movement of a machine tool along a path in accordance with commanded departure distances along mutually perpendicular first and second axis and at a velocity in accordance with a commanded vectorial velocity wherein the path is dependent upon the vectorial summation of the commanded departure distances, comprising:

means for providing a train of pulses at a first pulse rate, means for providing first and second signals which have values which are respectively dependent upon the value of the commanded departure distance along said first axis and the value of the commanded departure distance along said second axis, means responsive to said first and second signals for providing a third signal having a value corresponding with a function of the value of the square root of the sum of the squares of said commanded departure distances, means for providing a fourth signal having a value corresponding with the value of said commanded vectorial velocity, ratio calculating means for receiving said third and fourth signals for directly calculating from the values of only said third and fourth signals the ratio of a function of the value of said fourth signal to the value of said third signal and providing a fifth signal having a value in dependence upon the value of said ratio, and means for varying the pulse rate of said train of pulses in dependence upon the value of said fifth signal for use in controlling movement of said tool.

17. A control for controlling movement of a machine tool along a path in accordance with commanded departure distances along mutually perpendicular first and second axes and at a velocity in accordance with a commanded vectorial velocity wherein the path is dependent upon the vectorial summation of the commanded departure distances, comprising:

means for providing a train of pulses at a first pulse rate, means for providing first and second signals which have values which are respectively dependent upon the value of the commanded departure distance along said first axis and the value of the commanded departure distance along said second axis, means responsive to said first and second signals for providing a third signal having a value corresponding with a function of the value of square root of the sum of the squares of said commanded departure distances, means for providing a fourth signal having a value corresponding with the value of said commanded vectorial velocity, ratio calculating means for receiving said third and fourth signals for directly calculating therefrom the ratio of a function of the value of said fourth signal to the value of said third signal and providing a fifth signal having a value in dependence upon the value of said ratio, means for varying the pulse rate of said train of pulses in dependence upon the value of said fifth signal for use in controlling movement of said tool, and wherein said ratio calculating means includes:

accumulator means, means for initially loading said accumulator means so that its contents have a value corresponding with a function of the value of said fourth signal, first means for iteratively developing an output signal having a value corresponding to the difference in the value of said accumulator contents and that of said third signal, comparing means operative during each iteration of said first means for comparing the value of the contents of said accumulator means with the value of said third signal and providing a first comparison signal or a second comparison signal in dependence upon said comparison, means selectively responsive to a said first comparison signal for updating said accumulator contents to a value of twice said difference and to a said second comparison signal for updating said accumulator contents to a value of twice its previous contents, and output means for providing said fifth signal in dependence upon the sequence that said first and second comparison signals have been provided for a given number of comparisons by said comparing means.

18. A control for controlling movement of a machine tool along a path in accordance with commanded departure distances along mutually perpendicular first and second axes and at a velocity in accordance with a commanded vectorial velocity wherein the path is dependent upon the vectorial summation of the commanded departure distances, comprising:

means for providing a train of pulses at a first pulse rate, means for providing first and second signals which have values which are respectively dependent upon the value of the commanded departure distance along said first axis and the value of the commanded departure distance along said second axis, means responsive to said first and second signals for providing a third signal having a value corresponding with a function of the value of square root of the sum of the squares of said commanded departure distances, means for providing a fourth signal having a value corresponding with the value of said commanded vectorial velocity, ratio calculating means for receiving said third and fourth signals for directly calculating therefrom the ratio of a function of the value of said fourth signal to the value of said third signal and providing a fifth signal having a value in dependence upon the value of said ratio, means for varying the pulse rate of said train of pulses in dependence upon the value of said fifth signal for use in controlling movement of said tool, said third and fourth signals are each multibit binary signals and said calculating means is a binary ratio calculator comprising:

binary accumulator means, means for initially loading said accumulator means so that its contents has a value corresponding with a function of the value of said fourth signal, binary adder means for iteratively developing a binary output signal having a value corresponding to the difference in the value of said accumulator contents and that of said third signal, binary signal comparing means operative during each iteration of said binary adder means for comparing the value of the contents of said accumulator means with that of said third signal and providing a binary comparison signal having a first binary level or a second binary level in dependence upon said comparison, means for selectively updating the value of the contents of said accumulator means for each iteration of said adder means in dependence upon the binary level of said comparison signal so that in response to a comparison signal of a first binary level, the accumulator contents are doubled and in response to a comparison signal of a second binary level, that accumulator contents are updated to a value which is double that of said difference, shift register means, means for iteratively loading said register means in synchronism with the iterations of said binary adder means for a given number of iterations corresponding with said number of bits in said third binary signal so that after said given number of iterations the binary contents of said register means presents a binary pattern from the most significant bit thereof to the least significant bit thereof sequentially corresponding to the binary levels of the comparison signals provided by said comparing means for said given number of iterations, said binary pattern defining said fifth signal.

19. A control as set forth in claim 18 including means for applying the ones complement of said third binary signal to said adder means, means for applying a multibit binary pattern signal to said adder means corresponding with the value of the contents of said accumulator means, and means for effectively applying a binary 1 signal to the least significant bit position of said adder means so that for each iteration said adder means provides a binary output signal corresponding in value with the difference between the value of the contents of said accumulator means and the value of said third binary signal.

20. A control as set forth in claim 18 including binary pulse rate multiplying means having a multiplier input for receiving said fifth signal from said shift register means for effecting a reduction in the pulse rate of said train of pulses to a lower pulse rate in dependence upon the value of said fifth signal.

21. A control as set forth in claim 18 wherein said shift register means is a serial input to parallel output shift register for sequentially shifting its contents to the next most significant bit positions for each iteration of said adder means, means for initially presetting the least significant bit position of said shift register means to a first binary level, means operative for each iteration of said adder means to apply said comparison signal of a said first or a said second level from said comparing means to the least significant bit position of said shift register means until said preset binary level signal has been shifted to the most significant bit position of said register means.

22. A control as set forth in claim 21 including control circuit means connected to the most significant bit position of said shift register means for terminating iterations of said adder means in response to detection of said preset binary level signal being located at the said most significant bit position.

* * * * *